(12) United States Patent
Inata et al.

(10) Patent No.: US 8,037,487 B2
(45) Date of Patent: Oct. 11, 2011

(54) OPTICAL DISK DEVICE

(75) Inventors: Masahiro Inata, Hyogo (JP); Kozo Ezawa, Osaka (JP); Teruyuki Takizawa, Osaka (JP); Hironori Tomita, Nara (JP)

(73) Assignee: Panasonic Corporation, Osaka (JP)

( * ) Notice: Subject to any disclaimer, the term of this patent is extended or adjusted under 35 U.S.C. 154(b) by 358 days.

(21) Appl. No.: 12/515,491

(22) PCT Filed: Sep. 18, 2008

(86) PCT No.: PCT/JP2008/002571
§ 371 (c)(1),
(2), (4) Date: May 19, 2009

(87) PCT Pub. No.: WO2009/037836
PCT Pub. Date: Mar. 26, 2009

(65) Prior Publication Data
US 2010/0050195 A1 Feb. 25, 2010

(30) Foreign Application Priority Data
Sep. 18, 2007 (JP) ................................ 2007-240567

(51) Int. Cl.
*G11B 17/03* (2006.01)
*G11B 17/046* (2006.01)
(52) U.S. Cl. .................. 720/634; 720/740; 720/647
(58) Field of Classification Search .................. 720/740, 720/647, 634
See application file for complete search history.

(56) References Cited

U.S. PATENT DOCUMENTS

| 2003/0112739 A1 | 6/2003 | Takizawa et al. |
| 2005/0018548 A1* | 1/2005 | Tamura et al. ............. 369/13.36 |
| 2009/0235294 A1* | 9/2009 | Ezawa et al. .................. 720/740 |

FOREIGN PATENT DOCUMENTS

| JP | 61-006974 | 1/1986 |
| JP | 9-153264 | 6/1997 |
| JP | 2001-035119 | 2/2001 |
| JP | 2001-143359 | 5/2001 |
| JP | 2003-228944 | 8/2003 |

OTHER PUBLICATIONS

International Search Report for corresponding application No. PCT/JP2008/002571 completed Oct. 14, 2008.

* cited by examiner

*Primary Examiner* — Jami M Valentine
(74) *Attorney, Agent, or Firm* — Renner, Otto, Boisselle & Sklar, LLP

(57) ABSTRACT

A disk drive according to the present invention includes: a cartridge holder; two guide walls arranged near the holder opening of the cartridge holder; a pair of opening/closing levers that have engaging portions to engage with portions of the cartridge and that turn; lever biasing springs for biasing the opening/closing levers; and an interlocking mechanism that makes the opening/closing levers rotate in synchronization with a clamp holder. The opening/closing levers turn such that when the cartridge starts to be inserted or finishes being ejected, the engaging portions get engaged with the cartridge with a narrower gap left between them than the gap between the guide walls and that when the cartridge gets loaded, the gap between the engaging portions becomes wider than the gap between the guide walls.

9 Claims, 18 Drawing Sheets (a)

(b)

(a)

(b)

(a)

(b)

OPTICAL DISK DEVICE

TECHNICAL FIELD

The present invention relates to a disk drive for reading and/or writing data from/on a disklike data storage medium such as an optical disk or a magnetic disk that is housed in a cartridge type housing.

BACKGROUND ART

Various disklike read-only or rewritable storage media, including optical disks such as a CDs and DVDs to read and write data using a light beam, magnetic disks such as flexible disks to read and write data using magnetism, and magneto-optical disks such as MOs and MDs to read and write data using a light beam and magnetism in combination, have already been used extensively around the world. Among other things, DVD-RAMs, MOs and other recordable media are housed in a cartridge such as the one disclosed in Patent Document No. 1 in order to protect the data stored there. As used herein, a "disk cartridge" refers to a cartridge in which such a disklike read-only or rewritable storage medium is housed.

FIG. 18 schematically illustrates the structure of the disk cartridge that is disclosed in Patent Document No. 1. As shown in FIG. 18, the disk cartridge 100 includes a cartridge body 101 that houses a read-only or rewritable disk 10 and that forms the outer shell of the disk cartridge 100.

The cartridge body 101 has a window 101w on the upper and lower surfaces thereof to allow some means for rotating the disk 10 (such as a disk motor) and a read/write means to enter the cartridge body 101 and access the disk 10. The cartridge body 101 also has inner walls for holding the disk 10 rotatably with the center of the disk 10 positioned and with some clearance left with respect to the disk 10.

The disk cartridge 100 includes a shutter 103 that has been folded in a C-shape to close the window 101w on the upper and lower surfaces of the cartridge body 101 and to protect the data side of the disk 10 to be exposed through the window 101w.

The shutter 103 can move parallel in the direction indicated by the arrow P in FIG. 18 and is biased by a spring so as to keep the window 101w closed unless some external force is applied thereto. Thus, this disk cartridge 100 is designed so as not to expose the disk 10 unless the external force is applied.

To perform a read/write operation on this disk cartridge 100 using a disk drive (not shown), the shutter 103 of the cartridge is moved in the direction indicated by the arrow P and the disk 10 is exposed in order to clamp the disk 10 and to allow a read/write means to access the disk 10. In this case, as the disk cartridge 100 being inserted into the disk drive goes in the direction indicated by the arrow Q, the notched portion 103a of the shutter 103 gets engaged with the protrusion 104a of a shutter opener 104 and the shutter opener 104 is turned around the center of rotation 104b in the direction indicated by the arrow R, thereby sliding the shutter 103 in the direction indicated by the arrow P.

Patent Document No. 1: Japanese Patent Application Laid-Open Publication No. 9-153264

DISCLOSURE OF INVENTION

Problems to be Solved by the Invention

As in the disk cartridge disclosed in Patent Document No. 1, to get the disk chucked and to allow the optical head to access the entire data side of the disk, the conventional disk cartridge needs to have a window that runs from the center of the cartridge through its end. Also, in a disk cartridge with such a structure, the shutter moves straight with respect to the shell of the cartridge, thus requiring a space to store the shutter opened. That is why the size of the window depends on the overall size of the cartridge, and therefore, it is difficult to design a small cartridge with a big window. As a result, in small portable devices and disk video cameras in which a small cartridge is used, the size of the optical head is limited.

In order to overcome the problems described above, the present invention has an object of providing a disk drive that is specially designed for a disk cartridge that can have a big head access window even though its overall size is small.

Means for Solving the Problems

A disk drive according to the present invention can be loaded with a disk cartridge that houses a disk therein. The drive includes: a cartridge holder for holding the disk cartridge, the holder having a holder opening, through which the disk cartridge is inserted from outside of the drive into the cartridge holder and ejected out of the cartridge holder; a pair of guide walls, which is arranged in the vicinity of the holder opening of the cartridge holder to define disk cartridge inserting and ejecting directions; a disk motor, which has a turntable to mount the disk thereon and which rotates the turntable; a head for reading and/or writing information from/on the disk; a clamper for clamping the disk with respect to the turntable; a clamper holder, which holds the clamper rotatably and which rotates with respect to the cartridge holder, thereby performing a clamper up/down operation such that the clamper is moved up and down between a rest position where the clamper is out of contact with the turntable and a clamp position where the disk gets clamped on the turntable; a traverse base for supporting the head and the disk motor thereon and also supporting the cartridge holder rotatably; a first opening/closing lever, which has a first engaging portion to engage with a portion of the disk cartridge and which turns while the disk cartridge is being inserted or ejected; a second opening/closing lever, which has a second engaging portion to engage with another portion of the disk cartridge and which also turns while the disk cartridge is being inserted or ejected; a first lever biasing spring for biasing the first opening/closing lever; a second lever biasing spring for biasing the second opening/closing lever; and an interlocking mechanism that makes the first and second opening/closing levers rotate in synchronization with the clamp holder. The first and second opening/closing levers turn such that when the disk cartridge starts to be inserted or finishes being ejected, the first and second engaging portions get engaged with the disk cartridge with a narrower gap left between themselves than the gap between the pair of guide walls and that when the disk cartridge gets loaded, the gap between the first and second engaging portions becomes wider than the gap between the pair of guide walls, thereby opening a window in the disk cartridge such that the head can access the disk and the disk motor can mount the disk thereon when the disk cartridge gets loaded and making the clamper holder move the clamper down and clamp the disk with respect to the turntable.

In one preferred embodiment, the first and second lever biasing springs are toggle springs that reverse directions to bias the first and second opening/closing levers between a direction to decrease the gap between the first and second engaging portions and a direction to increase the gap between the first and second engaging portions as the levers rotate. The reversing operation done by the toggle springs makes the first and second opening/closing levers, biased by the first and second lever biasing springs, drive the interlocking mechanism, and/or the rotation of the first and second opening/closing levers by the interlocking mechanism makes the toggle springs perform the reversing operation.

In this particular preferred embodiment, the interlocking mechanism includes: first and second sliding members that perform a slide operation in the inserting and ejecting directions to contact with the first and second opening/closing levers, thereby making the toggle springs perform the reversing operation and rotating the first and second opening/closing levers; and first and second connecting arms to be supported rotatably by the clamper holder and the first and second sliding members. The clamper holder, the first and second sliding members and the first and second connecting arms form link mechanisms. As the cartridge holder rotates, the first and second sliding members perform the slide operation, thereby rotating the first and second opening/closing levers.

In a specific preferred embodiment, the clamper holder has an engaging portion to get engaged with the traverse base. With the engaging portion engaged with the traverse base, as the cartridge holder rotates with respect to the traverse base, the clamper holder rotates with respect to the cartridge holder, thereby performing the clamper up/down operation.

In a more specific preferred embodiment, the disk cartridge includes: first and second disk housing portions, each of which has a space to house the disk partially and which house the disk entirely when joined together; and a supporting base member for supporting the first and second disk housing portions so as to allow the first and second disk housing portions to turn around their respective pivots. The first and second engaging portions get engaged with the first and second disk housing portions, respectively, thereby turning the first and the second disk housing portions so as to open a window in the disk cartridge being inserted.

In another preferred embodiment, each of the first and second disk housing portions of the disk cartridge includes: a notch, with which an associated one of the first and second engaging portions of the first and second opening/closing levers engages rotatably; a pivot; and an interlocking portion. The interlocking portions of the first and second disk housing portions engage with each other such that the first and second disk housing portions turn around the pivots in mutually opposite directions synchronously with each other.

In this particular preferred embodiment, as the first engaging portion gets engaged rotatably with the notch of the first disk housing portion while the disk cartridge is being inserted or ejected, a first link mechanism is formed by respective nodes that are defined by the pivot of the first opening/closing lever, the engagement between the first engaging portion and the notch, and the pivot of the first disk housing portion. As the second engaging portion gets engaged rotatably with the notch of the second disk housing portion while the disk cartridge is being inserted or ejected, a second link mechanism is formed by respective nodes that are defined by the pivot of the second opening/closing lever, the engagement between the second engaging portion and the notch, and the pivot of the second disk housing portion. And as the first and second disk housing portions turn around their pivots in mutually opposite directions synchronously with each other, the first and second link mechanisms get the disk cartridge inserted in a predetermined direction.

In another preferred embodiment, the disk drive further includes a positioning portion to contact with the outer edge of the disk when the disk cartridge is loaded. The positioning portion and the disk contact with each other, thereby positioning the center of the disk with respect to the disk motor.

In a specific preferred embodiment, the positioning portion forms part of the cartridge holder.

Effects of the Invention

When a disk cartridge is inserted into the disk drive of the present invention, the gap between the first and second engaging portions of the first and second opening/closing levers is narrower than the gap between the pair of guide walls. That is why the first and second engaging portions of the first and second opening/closing levers can contact and engage firmly with the disk cartridge being inserted. In addition, the first and second engaging portions of the first and second opening/closing levers move along the first and second guide grooves such that the gap between the first and second engaging portions will become broader than the gap between the pair of guide walls when the disk drive has been loaded with the disk cartridge. For that reason, when the disk housing is opened, a big window can be made with the shutter and housing portions sticking out of the projection area of the disk cartridge when the disk is housed therein. Consequently, this disk drive is compatible with a disk cartridge that has a big head access window for its small overall size.

In addition, this disk drive includes an interlocking mechanism that makes the first and second opening/closing levers rotate in synchronization with the clamper holder. That is why while the first and second opening/closing levers are opening a window in the disk cartridge, the clamper holder can move the clamper down and get the disk clamped between the clamper and the turntable. These two operations can get done synchronously with each other by the interlocking mechanism. Consequently, the window can be opened in the disk cartridge, and the disk can get clamped by the clamper, at the best timing and just as intended.

Furthermore, since the first and second opening/closing levers are biased by toggle springs that reverse the biasing directions, the interlocking mechanism can be driven exactly when the toggle springs reverse the biasing directions. As a result, the rotation of the clamper holder that is synchronized with the operation of the interlocking mechanism is not exactly in synchronization with the operation of the first and second opening/closing levers but only the first and second opening/closing levers will operate for some time. Consequently, the timing to form the window in the disk cartridge and the timing to move the clamper up or down can be controlled appropriately.

Figure 1:
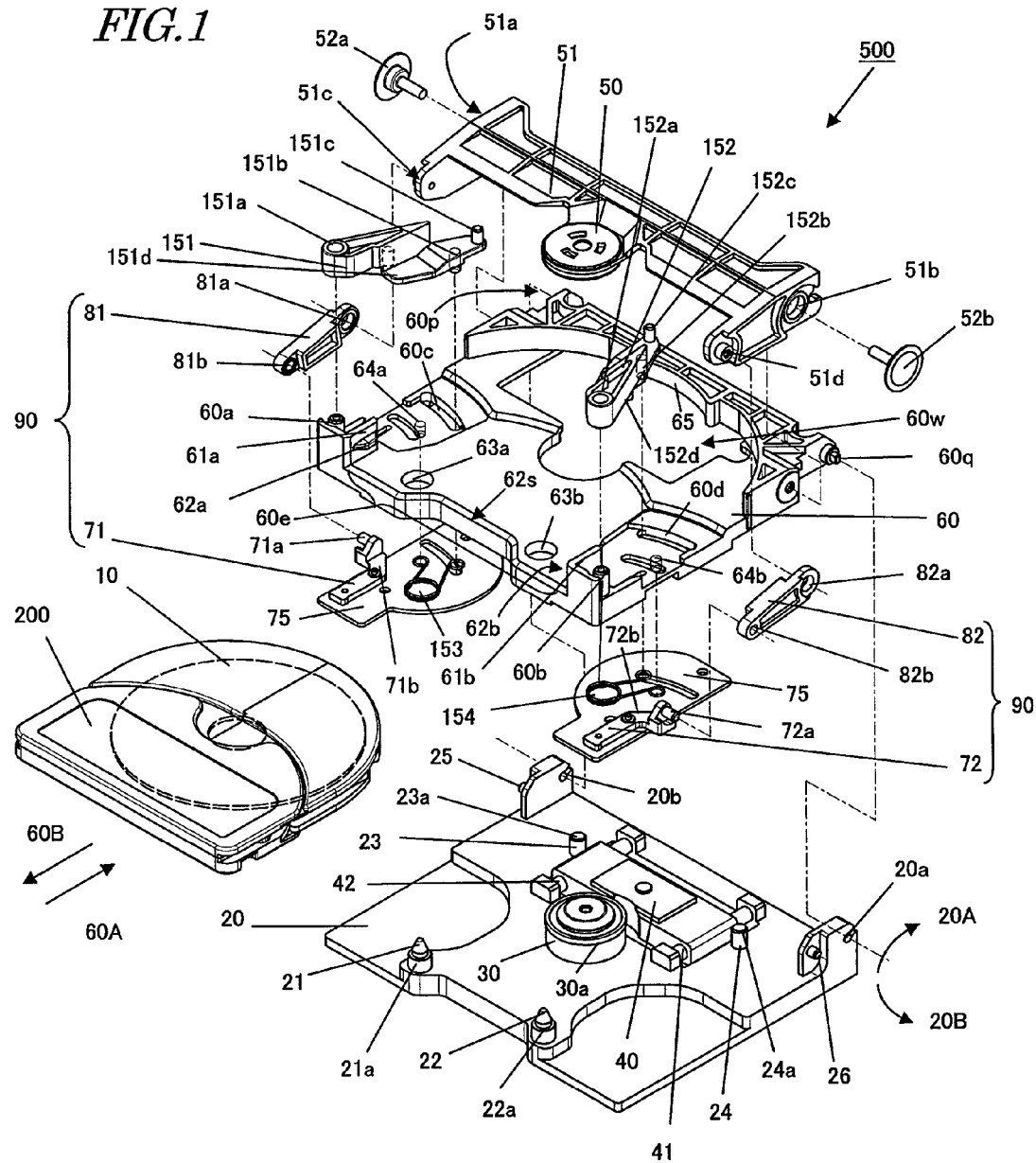
FIG. 1 is an exploded perspective view illustrating the structure of a disk drive as a preferred embodiment of the present invention.

DESCRIPTION OF REFERENCE NUMERALS 10 disk
20 traverse base
21, 22 cartridge positioning pin
30 disk motor
40 optical head
50 clamper
51 clamper holder
60 cartridge holder
65 positioning portion
71 first sliding member
72 second sliding member
81 first connecting arm
82 second connecting arm
151 first biasing lever
152 second biasing lever
153 first lever biasing spring
154 second lever biasing spring
200 disk cartridge
211 upper supporting base portion
212 lower supporting base portion
220 disk housing
220w window
221 first disk housing portion
222 second disk housing portion
231 first locking member
232 second locking member

BEST MODE FOR CARRYING OUT THE INVENTION

The applicant of the present application proposed a disk cartridge that has a small overall size but can still have a big head access window in PCT International Application PCT/JP2007/059444, which has not been laid open yet. The disk drive of the present invention is compatible with such a disk cartridge. Hereinafter, the structure of that disk cartridge will be described. In the following description, the entire disclosure of PCT International Application PCT/JP2007/059444 is hereby incorporated by reference.

Figure 13:
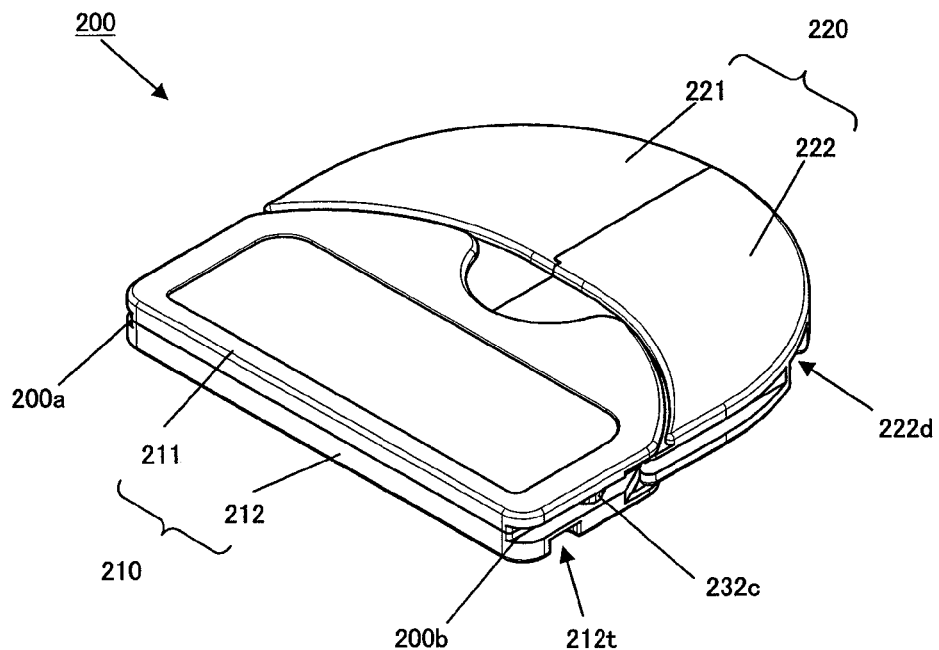
FIGS. 13(a) and 13(b) are perspective views illustrating the general appearance of a disk cartridge that opens and closes a window by turning its disk housing portions in two opposite directions in a situation where the disk housing portions are closed and in a situation where the disk housing portions are opened, respectively.
Figure 13:
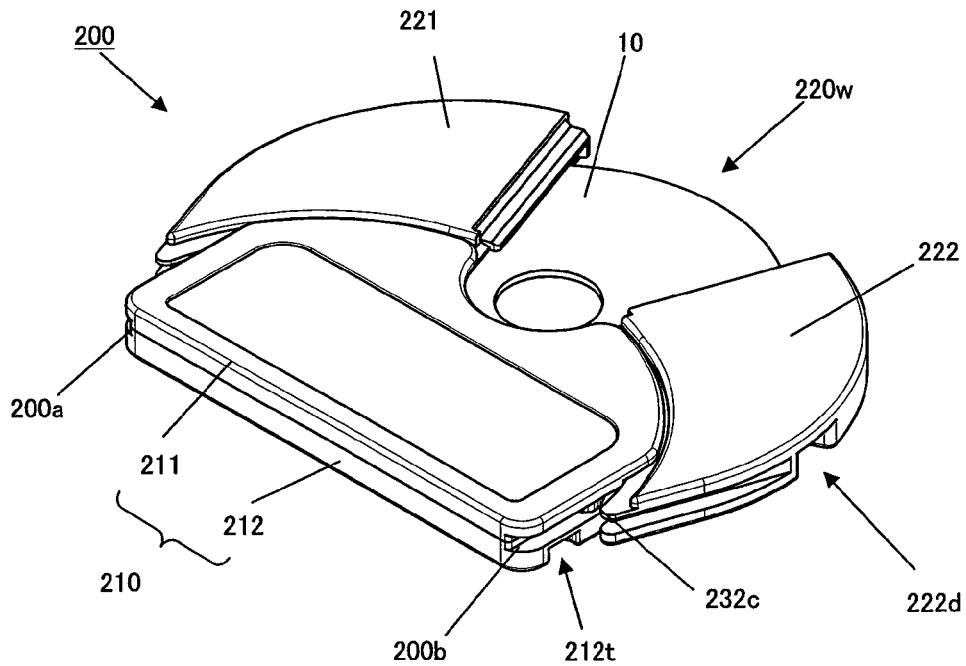
Figure 14:
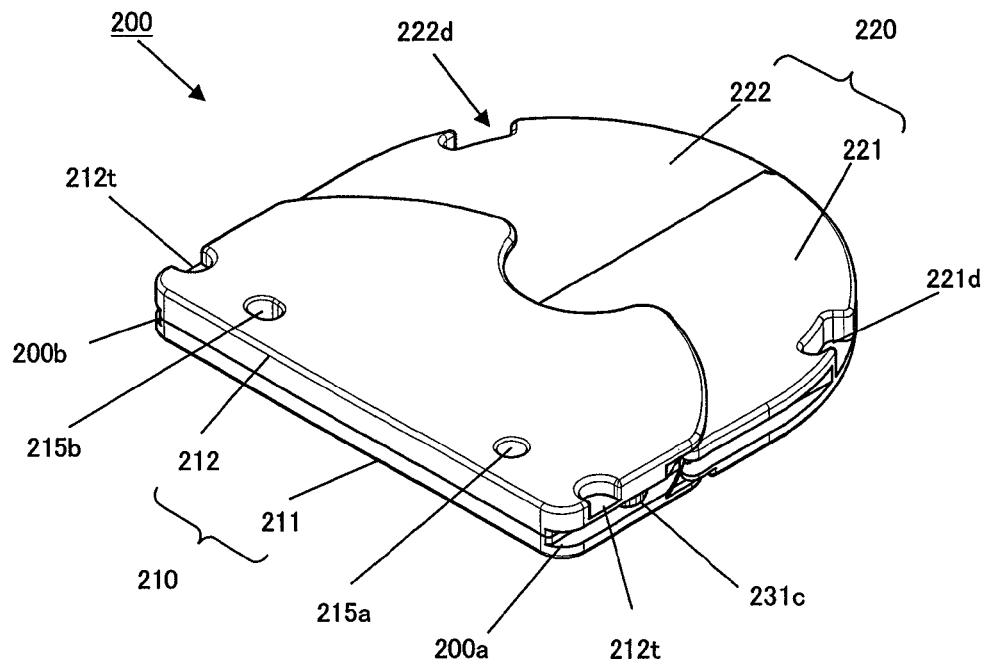
FIGS. 14(a) and 14(b) are perspective views illustrating the general appearance of the bottom of the disk cartridge that opens and closes a window by turning its disk housing portions in two opposite directions in a situation where the disk housing portions are closed and in a situation where the disk housing portions are opened, respectively.
Figure 14:
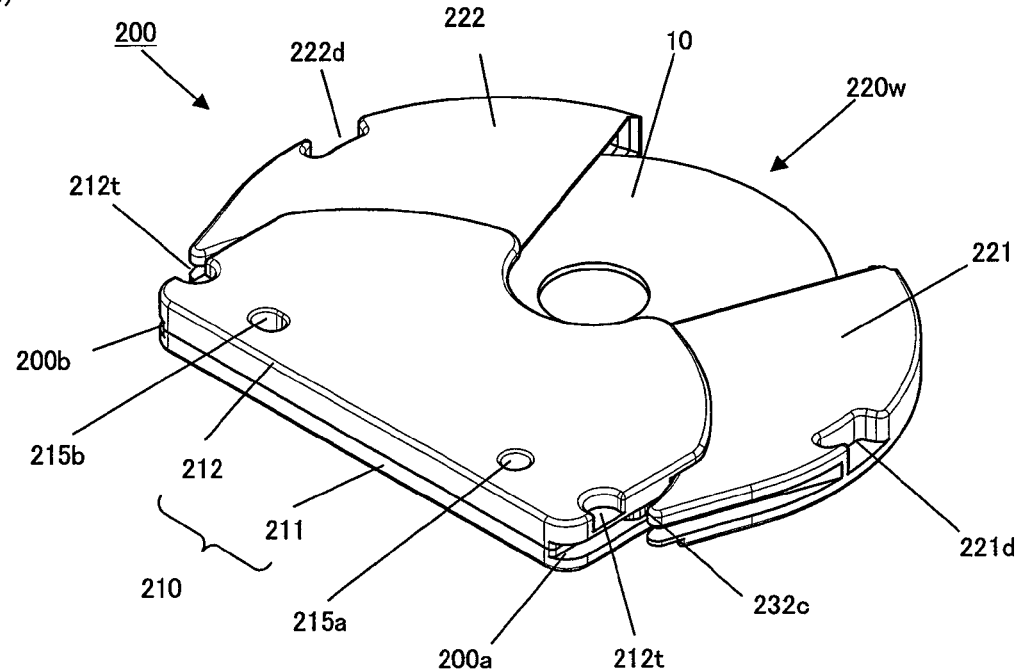
Figure 15:
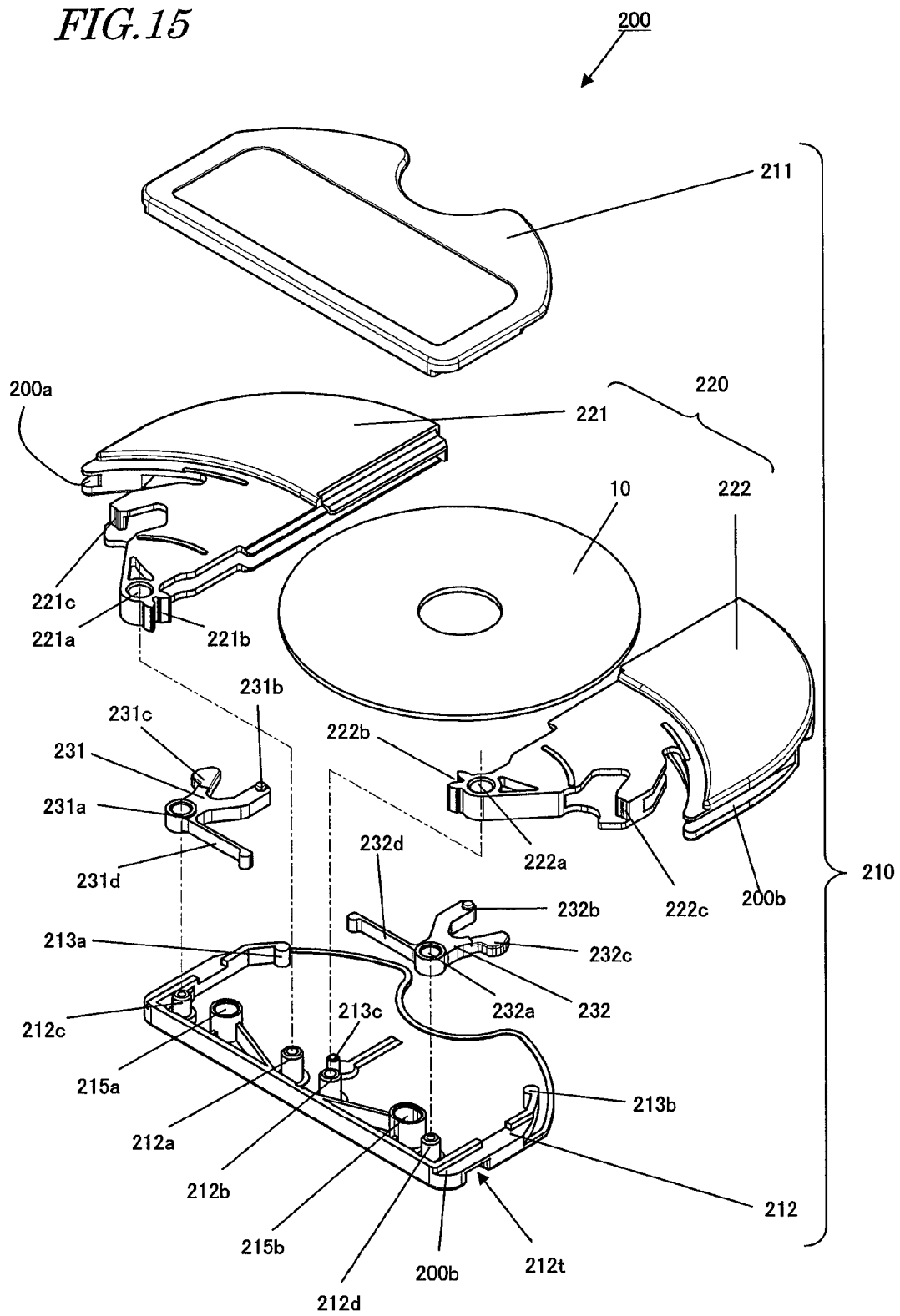
FIG. 15 is an exploded perspective view illustrating the makeup of such a disk cartridge that opens and closes a window by turning its disk housing portions in two opposite directions.

FIGS. 13(a) and 13(b) are perspective views illustrating the general appearance of a disk cartridge 200 that can be loaded into the disk drive of the present invention as viewed from above the upper side thereof. Specifically, FIG. 13(a) illustrates how the disk cartridge 200 looks when its window is closed, and FIG. 13(b) illustrates how the disk cartridge 200 looks when the window is opened to partially expose a disk 10 inside the cartridge 200. On the other hand, FIGS. 14(a) and 14(b) are perspective views illustrating the general appearance of the disk cartridge 200 as viewed from above the lower side thereof. Specifically, FIG. 14(a) illustrates how the disk cartridge 200 looks when its window is closed, and FIG. 14(b) illustrates how the disk cartridge 200 looks when the window is opened to partially expose the disk 10 inside the cartridge 200. And FIG. 15 is an exploded perspective view illustrating respective members that form the disk cartridge 200.

The disk cartridge 200 includes a first disk housing portion 221, a second disk housing portion 222 and a supporting base member 210.

The first and second disk housing portions 221 and 222 each have a space to house a portion of the disk 10 and form a disk housing 220 to house the disk 10 in its entirety when joined together. More specifically, each of the first and second disk housing portions 221 and 222 has a flat baglike space to house a portion of the disk 10. And by merging the first and second disk housing portions 221 and 222 together with the edges of their openings fitted into each other, a space to house the entire disk 10 is produced. In the following description, the first and second disk housing portions 221 and 222 will sometimes be referred to herein as a "disk housing 220" collectively.

The supporting base member 210 supports the first and second disk housing portions 221 and 222 thereon such that these housing portions 221 and 222 can turn around their axes of rotation. At least a portion of the supporting base member 210 overlaps with the first and second disk housing portions 221 and 222 to prevent the first and second disk housing portions 221 and 222 to move perpendicularly to the disk 10.

As shown in FIGS. 13(b) and 14(b), when the first and second disk housing portions 221 and 222 are opened, a substantially fan-shaped window 220w is made to allow a disk motor, clamper and other members for rotating the disk 10 and a read/write head to approach and access the disk 10 from outside of the disk cartridge 200.

Therefore, the first and second disk housing portions 221 and 222 function not only as a housing, or an outer shell for the disk cartridge 200, but also as shutters for opening and closing the window 220w.

As shown in FIGS. 13(a) and 14(a), as viewed from over the upper or lower side of the disk cartridge 200, the disk cartridge 200 has an arc shape where the window 220w is supposed to be opened. That is why the first and second disk housing portions 221 and 222 also have a curved side surface where the window 220w is supposed to be opened.

The supporting base member 210 includes an upper supporting base portion 211 and a lower supporting base portion 212. As shown in FIG. 15, the lower supporting base portion 212 has positioning holes 215a and 215b to position the disk cartridge 200 on a plane that is parallel to the disk 10 in the disk drive (not shown). Also, the lower supporting base portion 212 has notches 212t on both sides thereof. These notches 212t may be used to prevent the user from loading the disk cartridge 200 upside down in a tray loading system or to engage with the disk cartridge 200 in a slot loading system, for example.

The first and second disk housing portions 221 and 222 have pivot holes 221a and 222a, respectively, into which pivots 212a and 212b on the lower supporting base portion 212 are respectively inserted, thereby supporting the first and second disk housing portions 221 and 222 rotatably such that these housing portions 221 and 222 can turn around the pivots 212a and 212b, respectively.

The first and second disk housing portions 221 and 222 further have interlocking portions 221b and 222b that engage and interlock with each other. By engaging these interlocking portions 221b and 222b with each other, the first and second disk housing portions 221 and 222 can turn around their respective pivots 212a and 212b in mutually opposite directions and synchronously with each other.

Also, the first and second disk housing portions 221 and 222 have notches 221d and 222d, which can be used to open or close the first and second disk housing portions 221 and 222 externally.

A first locking member 231 and a second locking member 232 have pivot holes 231a and 232a, respectively, into which pivots 212c and 212d on the lower supporting base portion 212 are inserted, so as to be attached rotatably to the lower supporting base portion 212.

The first locking member 231 includes a catching lever portion 231b that catches the latching portion 221c of the first disk housing portion 221, thereby preventing the first disk housing portion 221 from turning in the opening direction while the first and second disk housing portions 221 and 222 are closed, an operation portion 231c for operating the first locking member 231 externally, and an elastic portion 231d that deforms elastically under externally applied force.

Likewise, the second locking member 232 also includes a catching lever portion 232b that catches the latching portion 222c of the second disk housing portion 222, thereby preventing the second disk housing portion 222 from turning in the opening direction while the disk housing 220 is closed, an operation portion 232c for operating the second locking member 232 externally, and an elastic portion 232d that deforms elastically under externally applied force.

Furthermore, the disk cartridge 200 has unlocking slits 200a and 200b for operating the first and second locking members 231 and 232 on the right- and left-hand sides thereof. The operation portions 231c and 232c of the first and second locking members 231 and 232 are designed so as to protrude into the slits 200a and 200b, respectively, but not to stick out of the outer shell of the disk cartridge. Thus the person who handles the disk cartridge 200 cannot easily press the operation portions 231c and 232c with his or her fingers. In this manner, it is possible to prevent the user from operating the locking members 231 and 232 intentionally and carelessly.

Figure 16:
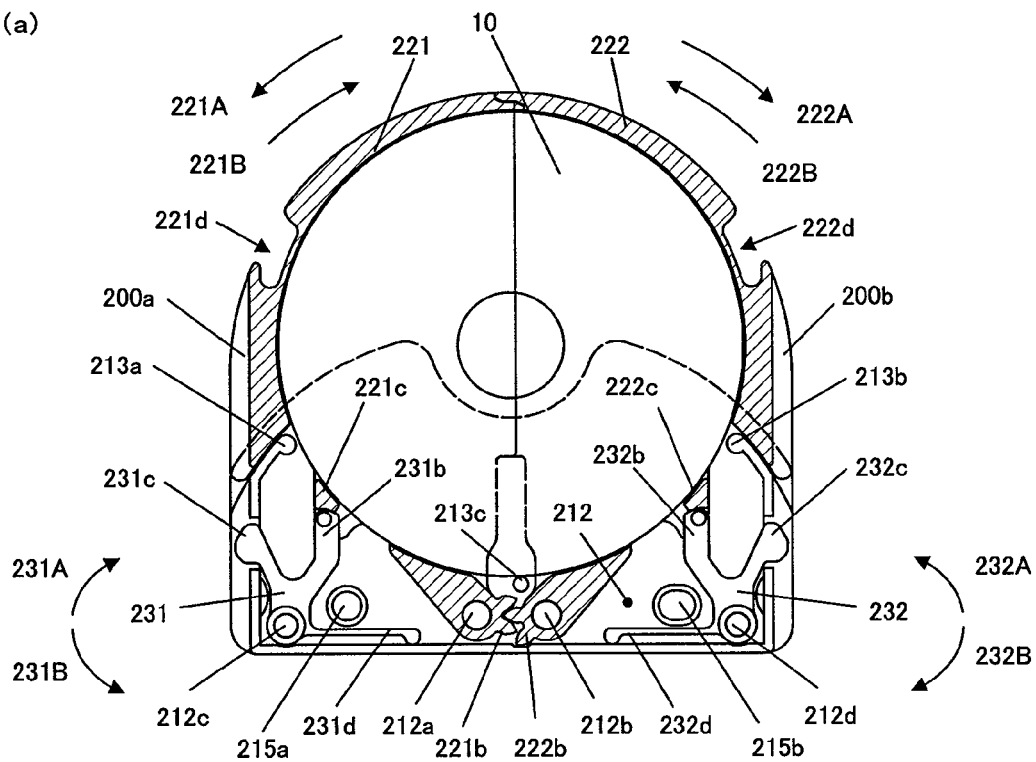
FIGS. 16(a) and 16(b) are partial cross-sectional views of the disk cartridge shown in FIG. 13 in a situation where the disk housing portions are closed and in a situation where the disk housing portions are opened, respectively.
Figure 16:
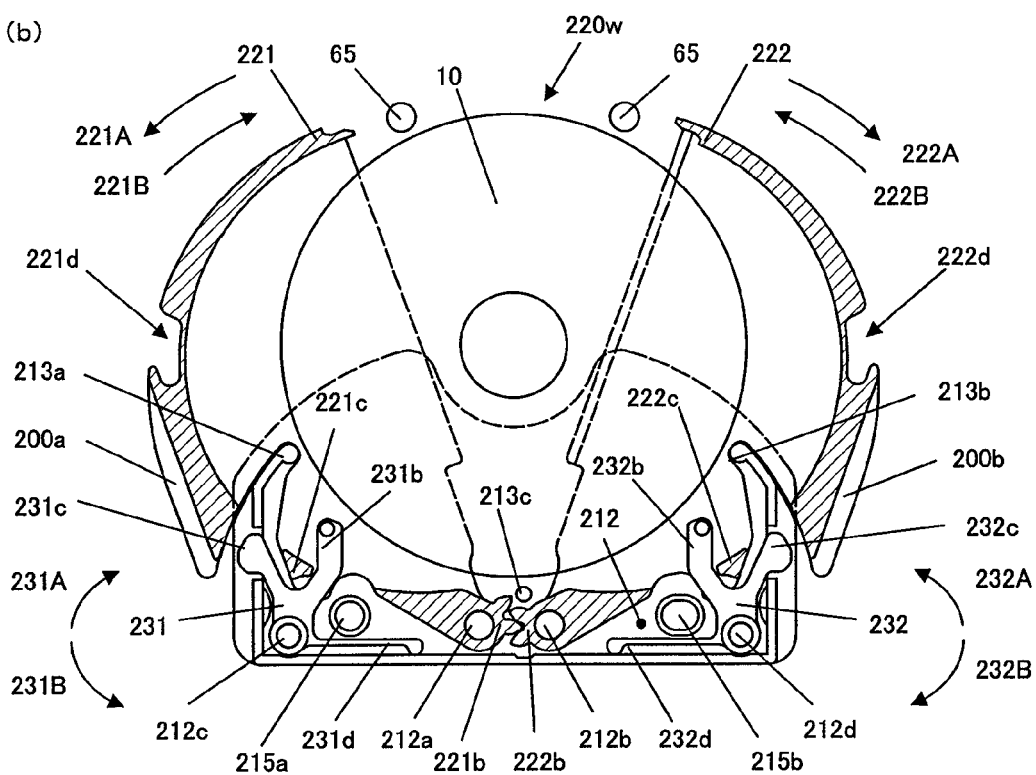

Hereinafter, it will be described exactly how to open or close the disk housing 220 of the disk cartridge 200. FIGS. 16(a) and 16(b) are partial cross-sectional views of the disk cartridge 200 in a situation where the first and second disk housing portions 221 and 222 are closed and a situation where the first and second disk housing portions 221 and 222 are opened, respectively.

As shown in FIG. 16(a), while the first and second disk housing portions 221 and 222 are closed, the catching lever portions 231b and 232b of the first and second locking members 231 and 232 catch the latching portions 221c and 222c of the first and second disk housing portions 221 and 222, thereby stopping the first and second disk housing portions 221 and 222 from turning in the directions indicated by the arrows 221A and 222A, respectively. In this case, the elastic portions 231d and 232d are not deformed elastically. Also, to prevent the disk 10 from rattling inside the disk cartridge 200, the inner walls of the first and second disk housing portions 221 and 222 have portions that contact with the periphery or the outer edge of the disk 10 to hold the disk 10 firmly when the disk housing 220 is closed.

If the first and second locking members 231 and 232 are pressed down and unlocked at the same time in the state shown in FIG. 16(a) to let the first and second disk housing portions 221 and 222 turn in the directions indicated by the arrows 221A and 222A, respectively, the first and second disk housing portions 221 and 222 are opened as shown in FIG. 16(b). In this state, the inner walls of the first and second disk housing portions 221 and 222 are out of contact with the disk 10 and therefore the disk 10 can now take any position with respect to the supporting base member 210 as far as the disk 10 keeps out of contact with the inner walls. That is why the position of the disk 10 is regulated with position regulating portions 213a, 213b and 213c on the lower supporting base portion 212 and positioning portions 65 provided for the disk drive.

To close the first and second disk housing portions 221 and 222, the first and second disk housing portions 221 and 222 are turned in opposite directions (i.e., in the directions indicated by the arrows 221B and 222B, respectively) compared to the opening operation. In the meantime, the first and second locking members 231 and 232 contact with the latching portions 221c and 222c of the first and second disk housing portions 221 and 222 to rotate in the directions 231A and 232A, respectively. And when the disk housing 220 is fully closed as shown in FIG. 16(a), the first and second locking members 231 and 232 rotate in the directions indicated by the arrows 231B and 232B, respectively, under the elastic force applied by their own elastic portions 231d and 232d. As a result, the catching lever portions 231b and 232b of the first and second locking members 231 and 232 catch the latching portions 221c and 222c of the first and second disk housing portions 221 and 222, respectively, thereby stopping the disk housing 220 from turning anymore. In this manner, the operation of closing the first and second disk housing portions 221 and 222 can get done.

In the disk cartridge 200, the overall projection area of the disk 10, the first and second disk housing portions 221, 222 and the supporting base member 210 that is defined perpendicularly to the axis of rotation of the disk 10 is greater when the first and second disk housing portions 221 and 222 are opened as shown in FIG. 16(b) than when the first and second disk housing portions 221 and 222 are closed as shown in FIG. 16(a). However, since the window 220w can have an increased opening area, the head can be designed much more flexibly.

Figure 17:
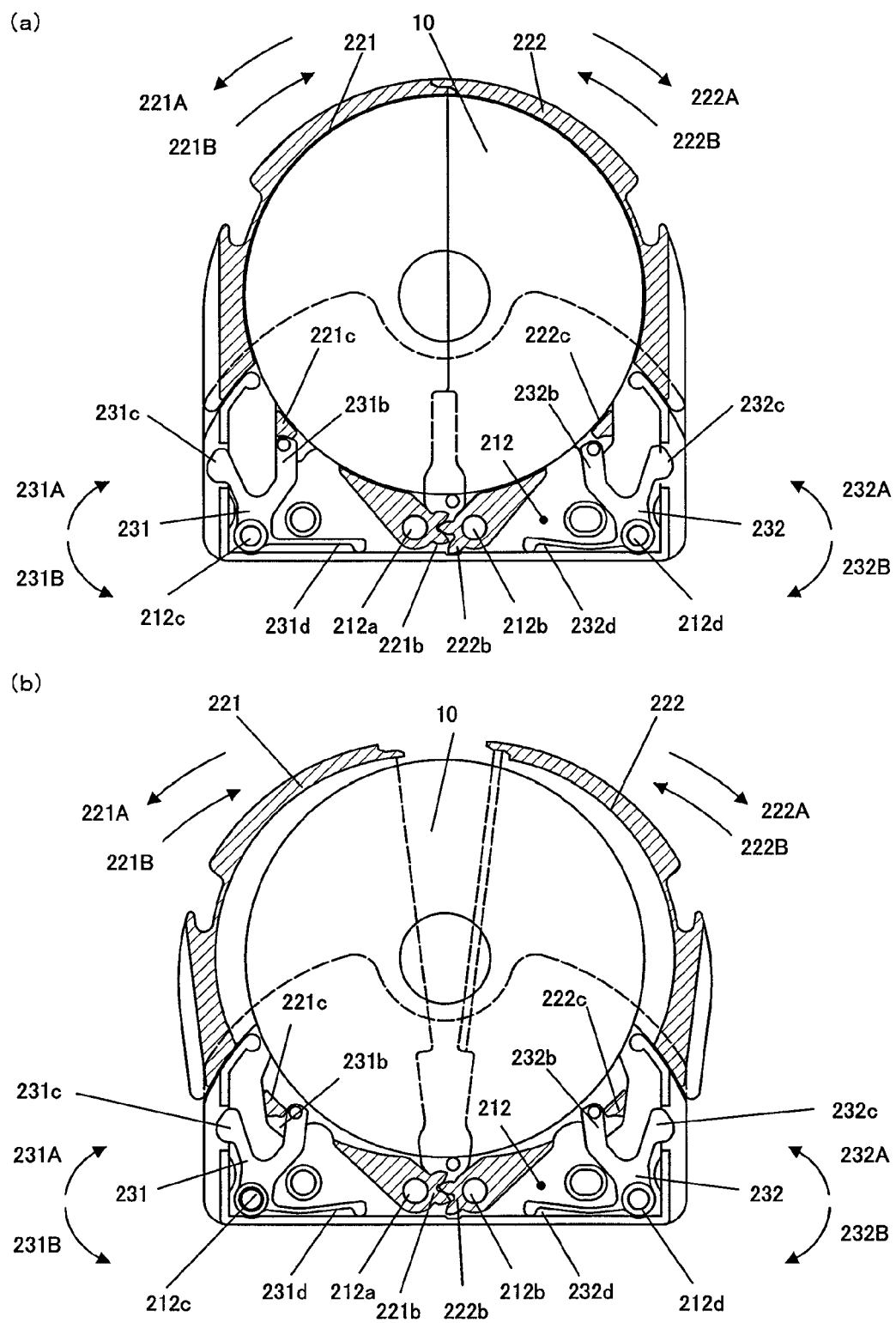
FIGS. 17(a) and 17(b) are partial cross-sectional views of the disk cartridge shown in FIG. 13 in a situation where only the second locking member has been unlocked and in a situation where both the first and second locking members have been unlocked.
Figure 18:
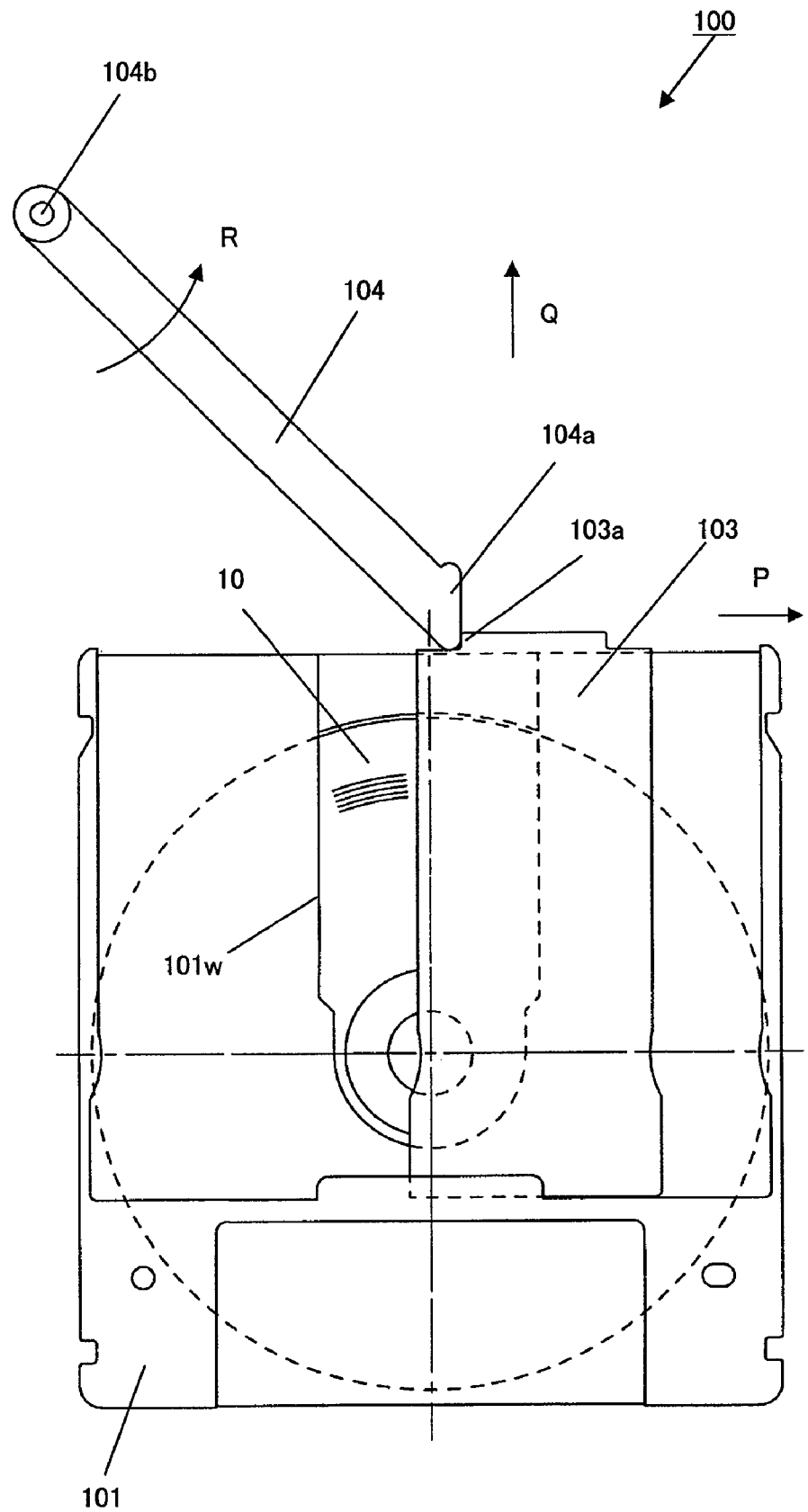
FIG. 18 is a plan view illustrating the general appearance of a conventional disk cartridge and one state thereof while the shutter of that cartridge is being opened or closed.

Next, an unlocking operation will be described. FIG. 17(a) illustrates a situation where only the second locking member 232 has been unlocked while the first and second disk housing portions 221 and 222 are locked with the first and second locking members 231 and 232. On the other hand, FIG. 17(b) illustrates a situation where both the first and second locking members 231 and 232 have been unlocked while the first and second disk housing portions 221 and 222 are locked with the first and second locking members 231 and 232. While closed, the first and second disk housing portions 221 and 222 are prevented from turning in the directions indicated by the arrows 221A and 222A, respectively, by the first and second locking members 231 and 232 as shown in FIG. 17(a).

As shown in FIG. 17(a), if the operation portion 232c of the second locking member 232 is pressed down externally, the second locking member 232 rotates in the direction indicated by the arrow 232A with its elastic portion 232d deformed. In this state, the catching lever portion 232b of the second locking member 232 disengages itself from the latching portion 222c of the second disk housing portion 222. However, the first and second disk housing portions 221 and 222 are still engaged with each other by their interlocking portions 221b and 222b and the first disk housing portion 221 is still locked by the first locking member 231. For that reason, the first disk housing portion 221 locked prevents the second disk housing portion 222 from rotating and never allows the user from opening the first and second disk housing portions 221 and 222. That is to say, even if one of the first and second locking members 231 and 232 were intentionally unlocked externally, the first and second disk housing portions 221 and 222 still could not be opened.

However, if the operation portions 231c and 232c of the first and second locking members 231 and 232 are externally pressed down at the same time, the first and second locking members 231 and 232 rotate in the directions indicated by the arrows 231A and 232A, respectively, with their elastic portions 231d and 232d deformed as shown in FIG. 17(b). In this state, the catching lever portions 231b and 232b of the first and second locking members 231 and 232 disengage themselves from the latching portions 221c and 222c of the first and second disk housing portions 221 and 222. As a result, the first and second disk housing portions 221 and 222 can now rotate in the directions indicated by the arrows 221A and 222A and can be opened eventually. As can be seen, only when the first and second locking members 231 and 232 are unlocked at the same time, the first and second disk housing portions 221 and 222 can be opened.

If such a disk cartridge 200 that opens and closes the window 220w using the first and second disk housing portions 221 and 222 functioning as both shutters and a housing alike is loaded into a disk drive, then the profile of the disk cartridge 200 changes as the disk housing 220 is opened or closed, unlike the conventional disk cartridge 100. The present inventors discovered that's why a disk drive compatible with such a disk cartridge 200 should overcome several newly arisen problems that would not occur in a conventional disk drive to be loaded with the conventional disk cartridge 100.

Specifically, since the profile of the disk cartridge 200 changes as described above as the disk housing 220 is opened and closed, it is difficult to get the disk housing 220 opened and closed with good stability and just as intended while guiding the disk cartridge 200 being inserted or ejected, which is a problem.

In addition, the disk cartridge 200 with such varying profiles is less easy to use as an inserting and ejecting operation guide than the conventional disk cartridge 100, thus making it difficult to ensure that the disk cartridge 200 being inserted or ejected goes straight all the way or to hold the disk housing 220 firmly. As a result, the operation of inserting or ejecting the disk cartridge would lose stability, which is also a problem.

On top of that, since the disk housing 220 also functions as a housing, not just the supporting base member 210 but also the disk housing 220 should be properly held and positioned to leave clearance that is ample enough to make the disk 10 rotatable within the disk drive.

Also, when the disk housing 220 is closed, the disk cartridge 200 has some degree of steadiness because the edges of the first and second disk housing portions 221 and 222 can be closely fitted into each other. When the disk housing 220 is opened, however, the edges of the first and second disk housing portions 221 and 222 are not supported one upon the other, and therefore, the disk cartridge 200 comes to have a very fragile structure, which is another problem.

What is more, since the disk housing 220 functions not only as housing but also as shutters, the cartridge projection area, which is defined by the disk 10, the disk housing 220 and the supporting base member 210 perpendicularly to the axis of rotation of the disk 10, increases as the disk housing 220 is opened wider and wider. And when the disk housing 220 is fully opened, the cartridge projection area becomes the maximum. As a result, the window 220w can certainly have a larger area and the head can be designed more flexibly. However, this also means that the disk cartridge 200 will occupy a broader area within the disk drive, which produces another problem.

Furthermore, if the disk 10 is clamped rotatably with the clamper, the disk housing 220 is gradually closed as the disk cartridge 200 is ejected little by little. That is why unless the timing to close the disk housing 220 and the timing to retract the clamper were well controlled, the disk housing 220 and the clamper would interfere with each other and the disk cartridge 200 could not be ejected properly. This is also a problem.

With these newly arisen problems taken into consideration, the present inventors designed a disk drive compatible with a disk cartridge that can have a big head access window for its small overall size. The disk drive of the present invention can be loaded with the disk cartridge 200 described above to read and write information from/on the disk 10 that is housed in the disk cartridge 200. As used herein, the "loaded" state refers to a state in which a read/write operation is ready to be performed on the disk 10 that has already been mounted on the disk motor after the disk cartridge 200 has been inserted into the disk drive. As the structure of the disk cartridge 200 has already been described with reference to FIGS. 13 through 17, the following description of a preferred embodiment of a disk drive according to the present invention will be focused on the structure of the disk drive. First, the structure of a disk drive 500 as a preferred embodiment of the present invention will be described with reference to FIGS. 1 through 5.

FIG. 1 is an exploded perspective view of a disk drive 500 that can be loaded with the disk cartridge 200 according to the preferred embodiment of the present invention described above. As shown in FIG. 1, the disk drive 500 includes a traverse base 20, a disk motor 30 for rotating and driving the disk 10 and an optical head 40 that works as read/write means.

The disk motor 30 has a turntable 30*a* to mount the disk 10 and turns the turntable 30*a*, thereby rotating the disk 10 that is mounted on the turntable 30*a*. The disk motor 30 is supported on the traverse base 20.

The optical head 40 is supported on the traverse base 20 so as to move on guide shafts 41 and 42. Also, the optical head 40 is driven by a drive source (not shown), which is arranged on the traverse base 20, along the guide shafts 41 and 42 so as to move freely in the radial direction of the disk 10. Cartridge positioning pins 21 and 22 are arranged on the traverse base 20 so as to fit into the positioning holes 215*a* and 215*b* of the disk cartridge 200 and position the disk cartridge 200 with respect to the disk motor 30.

The cartridge positioning pins 21 and 22 respectively have bearing surfaces 21*a* and 22*a* that will contact with the bottom of the lower supporting base portion 212 of the disk cartridge 200.

Also arranged on the traverse base 20 are a fixing pin 23 with a bearing surface 23*a* that will contact with the bottom of the first disk housing portion 221 and another fixing pin 24 with a bearing surface 24*a* that will contact with the bottom of the second disk housing portion 222. These bearing surfaces 23*a* and 24*a*, as well as the bearing surfaces 21*a* and 22*a* of the cartridge positioning pins 21 and 22 mentioned above, determine the vertical level of the disk cartridge 200.

The disk drive 500 further includes a clamper 50, a clamper holder 51 and a cartridge holder 60 to be loaded with the disk cartridge 200.

The clamper 50 sandwiches the disk 10 between the turntable 30*a* of the disk motor 30 and itself, and clamps the disk 10 so that the disk 10 can be rotated by the disk motor 30.

The clamper holder 51 holds the clamper 50 rotatably with respect to the disk motor 30, and is supported rotatably on the cartridge holder 60 with shaft screws 52*a* and 52*b* inserted into the shaft holes 51*a* and 51*b* of the clamper holder 51. By rotating with respect to the cartridge holder 60, the clamper holder 51 performs a clamper up/down operation to move the clamper 50 up and down between a rest position where the clamper 50 is out of contact with the turntable 30*a* and a clamp position where the disk 10 gets clamped on the turntable by the clamper 50.

The cartridge holder 60 has a holder opening 60*e*, through which the disk cartridge 200 can be externally inserted into the cartridge holder 60 in the direction indicated by the arrow 60A or through which the disk cartridge 200 held in the cartridge holder 60 is ejected out of the holder 60 in the direction indicated by the arrow 60B. The cartridge holder 60 not only guides the disk cartridge 200 in the directions indicated by the arrows 60A and 60B while the disk cartridge 200 is being inserted or ejected into/out of the disk drive 500 but also holds the disk cartridge 200 being loaded into the disk drive 500.

In the vicinity of the holder opening 60*e* of the cartridge holder 60, arranged are two guide walls 61*a* and 61*b* for guiding the disk cartridge 200 such that the disk cartridge 200 is inserted in the direction indicated by the arrow 60A or ejected in the direction indicated by the arrow 60B.

The guide walls 61*a* and 61*b* include unlocking portions 62*a* and 62*b* that will go inside the unlocking slits 200*a* and 200*b* of the disk cartridge 200 being inserted in the direction indicated by the arrow 60A or ejected in the direction indicated by the arrow 60B, thereby pressing down the operation portions 231*c* and 232*c* of the first and second locking members 231 and 232 of the disk cartridge 200.

The bottom of the cartridge holder 60 has a window 60*w* to allow the disk motor 30 and the optical head 40 to access the disk 10. Also, to prevent the cartridge positioning pins 21 and 22 from interfering with the cartridge holder 60, the bottom of the cartridge holder 60 has holes 63*a* and 63*b*. Lower covers 75 are also provided.

The cartridge holder 60 further has a positioning portion 65 for positioning the disk 10 at the center of the disk motor 30 when the cartridge holder 60 is loaded with the disk cartridge 200.

On the holder opening 60*e* of the cartridge holder 60, a notch 62*s* may be provided in order to partially expose one side of the disk cartridge 200 ejected and thereby make it easier to remove the disk cartridge 200 from the cartridge holder 60.

Furthermore, by fitting the shafts 60*p* and 60*q* into the shaft center holes 20*a* and 20*b* of the traverse base 20, the cartridge holder 60 gets supported rotatably in the directions indicated by the arrows 20A and 20B with respect to the traverse base 20.

As the cartridge holder 60 is supported rotatably on the traverse base 20, latching bosses 25 and 26 on the traverse base 20 fit into the catching portions 51*f* and 51*e* of the clamper holder 51 as will be described later with reference to FIG. 4. As a result, as the cartridge holder 60 turns in the direction indicated by the arrow 20A or 20B, the clamper holder 51 also rotates in the direction indicated by the arrow 51A or 51B, thereby moving the clamper 50 up or down. It will be described in further detail later exactly how the clamper holder 51 turns in synchronization with the cartridge holder 60 rotating.

The disk drive 500 further includes a first opening/closing lever 151, a second opening/closing lever 152, an interlocking mechanism 90, a first biasing spring 153 and a second biasing spring 154.

The first opening/closing lever 151 has a first engaging portion 151*c* to get engaged with a portion of the disk cartridge 200 and turns while the disk cartridge 200 is being inserted or ejected. More specifically, the first opening/closing lever 151 has a pivot hole 151*a* and is supported rotatably on the cartridge holder 60 by having the pivot hole 151*a* fitted into a pivot 60*a* on the cartridge holder 60. As will be described in detail later, by getting the first engaging portion 151*c* engaged with the notch 221*d* of the first disk housing portion 221 of the disk cartridge 200 since the disk cartridge 200 started to be inserted and until the disk cartridge 200 has been ejected, the first opening/closing lever 151 opens and closes the first disk housing portion 221.

Likewise, the second opening/closing lever 152 has a second engaging portion 152*c* to get engaged with another portion of the disk cartridge 200 and turns while the disk cartridge 200 is being inserted or ejected. More specifically, the second opening/closing lever 152 has a pivot hole 152*a* and is supported rotatably on the cartridge holder 60 by having the pivot hole 152*a* fitted into a pivot 60*b* on the cartridge holder 60.

As will be described in detail later, by getting the first and second engaging portions 151*c* and 152*c* kept engaged with the respective notches 221*d* and 222*d* of the first and second disk housing portions 221 and 222 of the disk cartridge 200 since the disk cartridge 200 started to be inserted and until the disk cartridge 200 has been ejected, the first and second opening/closing levers 151 and 152 open and close the disk housing 220.

The interlocking mechanism 90 makes the first and second opening/closing levers 151 and 152 and the clamper holder 51 turn in synchronization with each other. For that purpose, the interlocking mechanism 90 includes first and second sliding members 71 and 72 and first and second connecting arms 81 and 82.

The first and second sliding members 71 and 72 are arranged between the cartridge holder 60 and lower covers 75 and are guided so as to move in the directions indicated by the arrows 60A and 60B. The first and second sliding members 71 and 72 have cam faces 71b and 72b, which respectively contact with contact portions 151d and 152d of the first and second opening/closing levers 151 and 152. As a result, as the first and second opening/closing levers 151 and 152 turn, the first and second sliding members 71 and 72 move in the direction indicated by the arrow 60B.

The first and second connecting arms 81 and 82 get engaged with the clamper holder 51 and the first and second sliding members 71 and 72, respectively. More specifically, by fitting the pivot holes 81a and 82a at one end of the first and second connecting arms 81 and 82 into their associated pivots 51c and 51d on the clamper holder 51, the first and second connecting arms 81 and 82 are secured rotatably to the clamper holder 51. And by inserting pivots 71a and 72a on the first and second sliding members 71 and 72 into their associated pivot holes 81b and 82b located at the other end of the first and second connecting arms 81 and 82, the first and second connecting arms 81 and 82 are secured rotatably to the first and second sliding members 71 and 72, respectively. In this manner, by connecting the clamper holder 51 with the first and second sliding members 71 and 72 via the first and second connecting arms 81 and 82, a link mechanism is formed by these members.

Consequently, as the first and second opening/closing levers 151 and 152 turn, the first and second sliding members 71 and 72 move, which in turn gets the clamper holder 51 rotated by the link mechanism.

The first and second lever biasing springs 153 and 154 may be torsion coil springs, for example. One end of the first and second lever biasing springs 153 and 154 is inserted into the spring pivots 151b and 152b of the first and second opening/closing levers 151 and 152, respectively, while the other end thereof is inserted into spring pivots 64a and 64b on the cartridge holder 60. Therefore, as will be described in detail later, formed is a toggle mechanism that reverses the directions in which the first and second opening/closing levers 151 and 152 are biased by the first and second lever biasing springs 153 and 154 according to the positions of the first and second opening/closing levers 151 and 152 turning.

Figure 2:
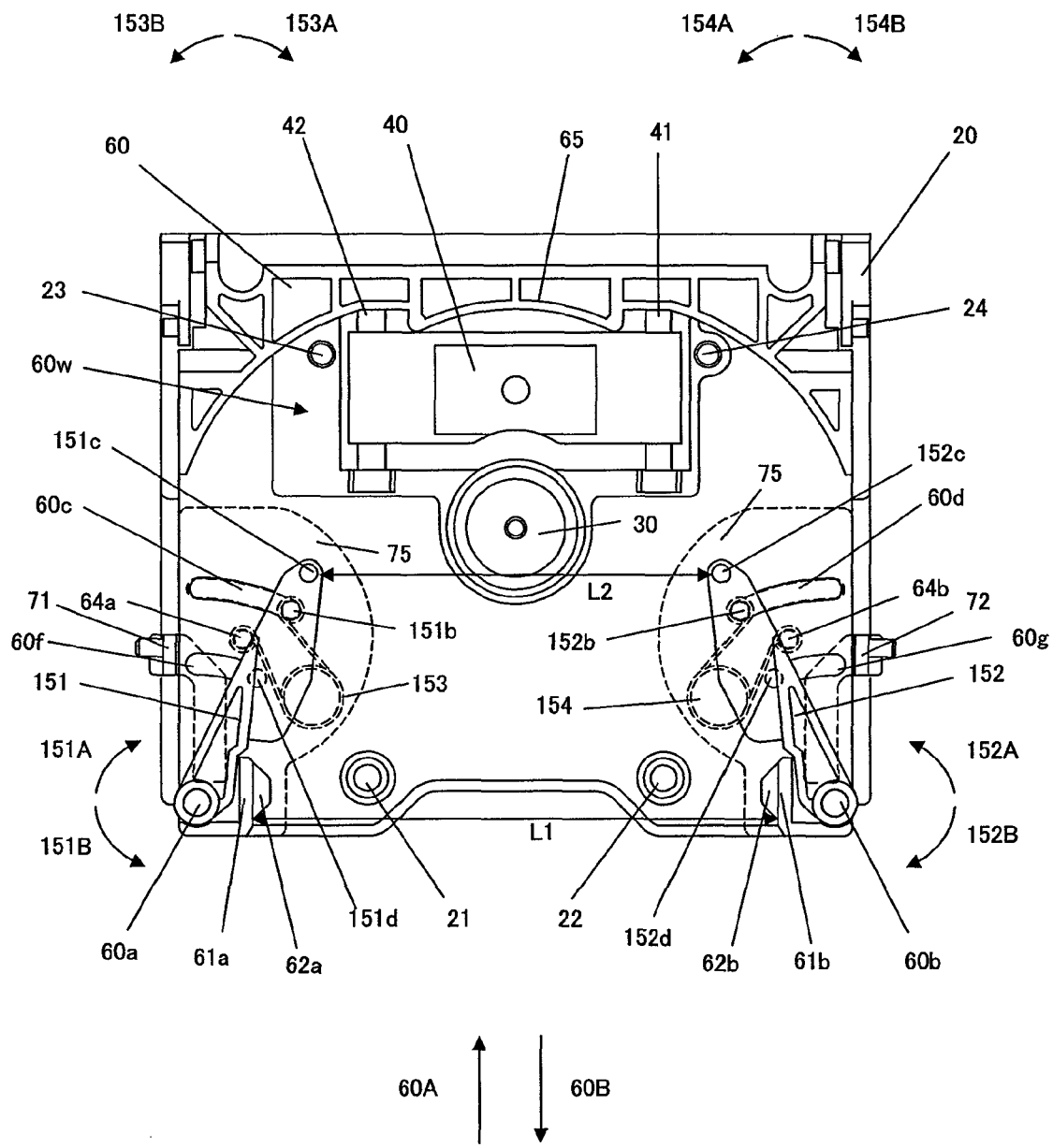
FIG. 2 is a plan view illustrating the status of the disk drive shown in FIG. 1 before the disk cartridge starts to be inserted, after the disk cartridge has just started to be inserted, and when the disk cartridge has been ejected.
Figure 3:
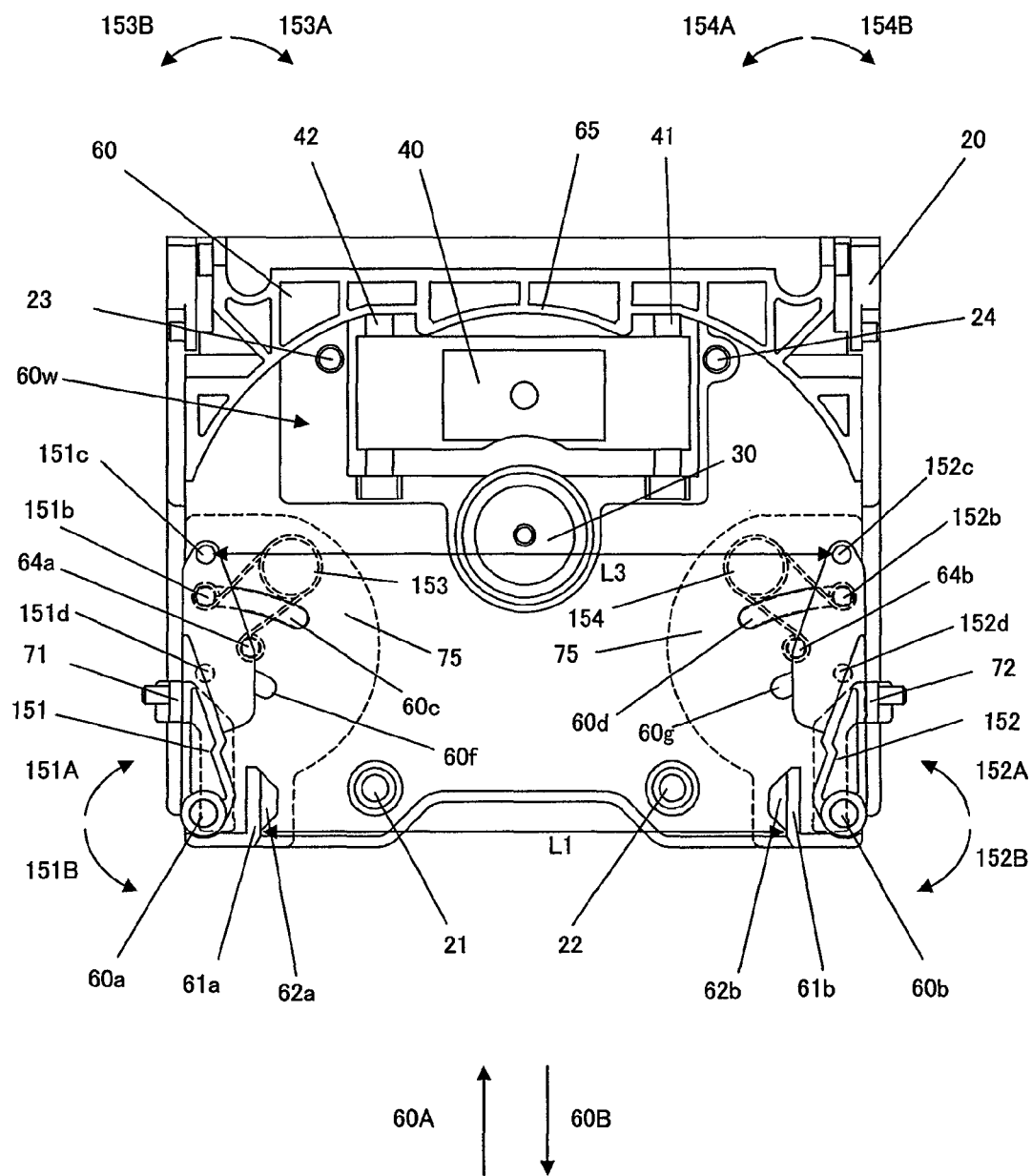
FIG. 3 is a plan view illustrating the status of the disk drive shown in FIG. 1 when the disk drive has been loaded with the disk cartridge.

FIGS. 2 and 3 are plan views of the disk drive 500 illustrating situations where the disk cartridge 200 is yet to be inserted, has just started to be inserted and has been ejected and a situation where the disk cartridge 200 has been loaded fully, respectively.

As shown in these drawings, the pivots 60a and 60b of the first and second opening/closing levers 151 and 152 are located closer to the front end of the disk drive 500 than the first and second engaging portions 151c and 152c of the first and second opening/closing levers 151 and 152 are. More specifically, the pivots 60a and 60b are arranged in the vicinity of the holder opening 60e and outside of the guide walls 61a and 61b. Also, the pivots 60a and 60b are arranged parallel to the directions in which the disk cartridge 200 is inserted and ejected (i.e., the directions indicated by the arrows 60A and 60B) and symmetrically to each other with respect to a plane that includes the axis of rotation of the disk 10.

Likewise, the first and second engaging portions 151c and 152c of the first and second opening/closing levers 151 and 152 are also arranged parallel to the directions in which the disk cartridge 200 is inserted and ejected and symmetrically to each other with respect to a plane that includes the axis of rotation of the disk 10.

Therefore, the first and second opening/closing levers 151 and 152 that make a pair are arranged parallel to the directions in which the disk cartridge 200 is inserted and ejected and symmetrically to each other with respect to such a plane that includes the axis of rotation of the disk 10.

On the bottom of the cartridge holder 60, guide holes 60c and 60d have been cut so that the cartridge holder 60 does not interfere with the spring pivots 151d and 152d of the first and second opening/closing levers 151 and 152 turning. If biasing force is applied by the first and second lever biasing springs 153 and 154 in the directions indicated by the arrows 153A and 154A, one end of the guide holes 60c and 60d contacts with the spring pivots 151d and 152d as shown in FIG. 2. Thus, the guide holes 60c and 60d serve as stoppers for regulating the rotation of the first and second opening/closing levers 151 and 152. As a result, the first and second opening/closing levers 151 and 152 are held at their predetermined rest positions. At this point in time, the gap L2 between the first and second engaging portions 151c and 152c of the first and second opening/closing levers 151 and 152 is narrower than the gap L1 between the guide walls 61a and 61b as shown in FIG. 2.

Also, as the first and second opening/closing levers 151 and 152 turn in the directions indicated by the arrows 151B and 152B, the first and second lever biasing springs 153 and 154 reverse the directions in which they apply the biasing force, compared to the status shown in FIG. 2, into the ones indicated by the arrows 153B and 154B as shown in FIG. 3. In that case, the other end of the guide holes 60c and 60d contacts with the spring pivots 151d and 152d. Thus, the guide holes 60c and 60d serve as stoppers for regulating the rotation of the first and second opening/closing levers 151 and 152. Consequently, even if the first and second opening/closing levers 151 and 152 happen to be turned due to some disturbance such as vibrations or shocks or an error committed by the operator, for example, to reverse the biasing directions of the first and second lever biasing springs 153 and 154 while the disk cartridge 200 has not been loaded yet, the guide holes 60c and 60d will function as stoppers, thereby holding the first and second opening/closing levers 151 and 152 at their predetermined rest positions. Also, thanks to the action of the interlocking mechanism to be described later, the first and second opening/closing levers 151 and 152 can recover the predetermined state shown in FIG. 2. At this point in time, the gap L3 between the first and second engaging portions 151c and 152c of the first and second opening/closing levers 151 and 152 is wider than the gap L1 between the guide walls 61a and 61b as shown in FIG. 3.

In the meantime, as shown in FIG. 3, the first and second sliding members 71 and 72 have also moved in the direction indicated by the arrow 60B from their positions shown in FIG. 2.

On the bottom of the cartridge holder 60, another pair of guide holes 60f and 60g has been cut to prevent the cartridge holder 60 from interfering with the contact portions 151d and 152d while the first and second opening/closing levers 151 and 152 are turning. The contact portions 151d and 152d are located at one end of the guide holes 60f and 60g in the status shown in FIG. 2 but have moved to the other end of the guide holes 60f and 60g in the status shown in FIG. 3.

Figure 4:
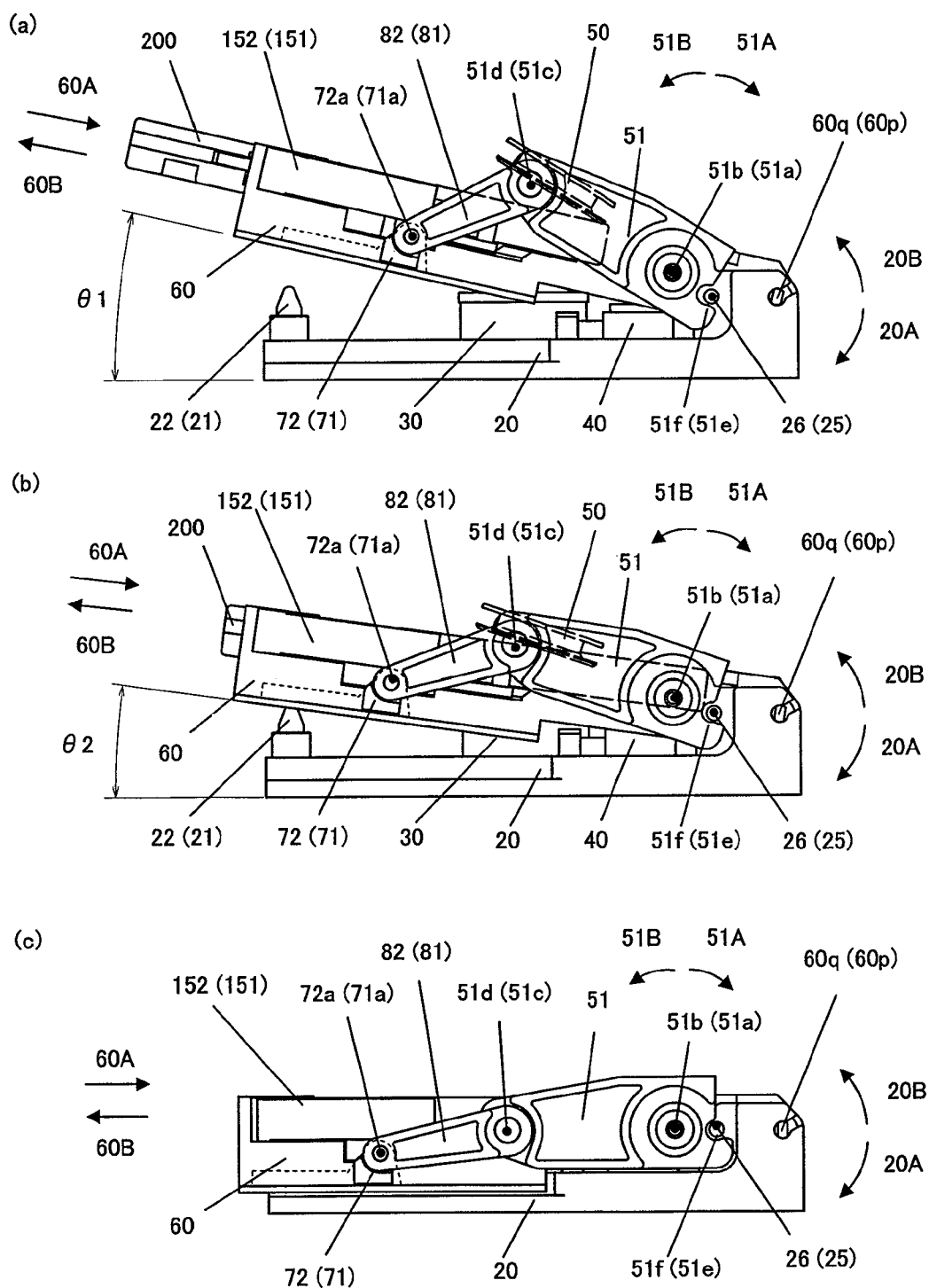
FIG. 4 illustrates side views of the disk drive shown in FIG. 1, wherein FIG. 4(*a*) shows the position of the cartridge holder when the disk cartridge either has just started to be inserted or has just been ejected, FIG. 4(*b*) shows the position of the cartridge holder while the disk cartridge is being inserted or ejected, and FIG. 4(*c*) shows the position of the cartridge holder when the disk drive gets ready to perform a read/write operation on the disk.

FIG. 4 illustrates side views of the disk drive 500, wherein FIG. 4(a) shows the position of the cartridge holder 60 when the disk cartridge 200 either has just started to be inserted or has just been ejected, FIG. 4(b) shows the position of the cartridge holder 60 while the disk cartridge 200 is being inserted or ejected, and FIG. 4(c) shows the position of the cartridge holder 60 when the disk drive 500 has been loaded with the disk cartridge 200 and gets ready to perform a read/write operation on the disk 10. Hereinafter, it will be described with reference to these drawings how to move the clamper 50 up or down by turning the cartridge holder 60 and how to move the sliding members 71 and 72 in synchronization with the turn of the cartridge holder 60. It should be noted that the side surface illustrated in FIG. 4 is on the side where the second sliding member 72 is located. Since the first and second sliding members 71 and 72 and the connecting arms 81 and 82 are arranged symmetrically to each other horizontally, the side view on the other side is omitted but just the members on the other side are identified by their reference numerals in parentheses.

Before inserting the disk cartridge 200 into the cartridge holder 60 in the direction indicated by the arrow 60A, the cartridge holder 60 has been rotated θ1 degrees in the direction indicated by the arrow 20A with respect to the traverse base 20 as shown in FIG. 4(a). In this manner, the disk cartridge 200 can be inserted into the cartridge holder 60 without being interfered with by the disk motor 30, the optical head 40, or the cartridge positioning pins 21 and 22 on the traverse base 20 or by the clamper 50.

The clamper holder 51 is supported rotatably by the cartridge holder 60 at the shaft holes 51a and 51b. That is why if the cartridge holder 60 has rotated θ1 degrees in the direction indicated by the arrow 20A, the clamper holder 51 also turns in the direction indicated by the arrow 51A with respect to the cartridge holder 60 due to the engagement of the latching bosses 25 and 26 on the traverse base 20 with the catching portions 51e and 51f of the clamper holder 51. As a result, the clamper 50 is lifted from the cartridge holder 60 and retracted so as not to interfere with the disk cartridge 200 being inserted into the cartridge holder 60.

Meanwhile, the first and second sliding members 71 and 72 (most of which is indicated by the dashed line), the clamper holder 51 rotating, and the first and second connecting arms 81 and 82 together form a link mechanism (i.e., a slider-crank mechanism). That is why as the clamper holder 51 turns in the direction indicated by the arrow 51A, the first and second sliding members 71 and 72 move in the direction indicated by the arrow 60A. FIG. 4(a) illustrates a situation where the disk cartridge 200 has just started to be inserted and where the clamper holder 51 has turned most in the direction indicated by the arrow 51A. That is why the first and second sliding members 71 and 72 have traveled most in the direction indicated by the arrow 60A.

As the disk cartridge 200 is going to be inserted deeper in the direction indicated by the arrow 60A from the position shown in FIG. 4(a), the first and second sliding members 71 and 72 slide in the direction indicated by the arrow 60B synchronously with the rotation of the first and second opening/closing levers 151 and 152 as will be described later. As the first and second sliding members 71 and 72 move in this manner, the link mechanism including them turns the clamper holder 51 in the direction indicated by the arrow 51B. As described above, the clamper holder 51 is supported rotatably by the cartridge holder 60 and engaged with the traverse base 20 at the catching portions 51e and 51f. That is why as the clamper holder 51 turns in the direction indicated by the arrow 51, the cartridge holder 60 rotates in the direction indicated by the arrow 20B as shown in FIG. 4(b). As a result, the angle defined by the cartridge holder 60 with respect to the traverse base 20 decreases to θ2. Meanwhile, the clamper 50 is moved down and starts to enter the disk cartridge 200.

If the disk cartridge 200 is inserted even deeper in the direction indicated by the arrow 60A from the position shown in FIG. 4(b) to rotate the cartridge holder 60 in the direction indicated by the arrow 20B, the disk cartridge 200 finally gets loaded into the cartridge holder 60 as shown in FIG. 4(c). Then, the window 220w of the disk cartridge 200 opens to allow the disk motor 30, optical head 40 and clamper 50 provided for the traverse base 20 to enter the disk cartridge 200 through the window 220w. In the meantime, the cartridge positioning pins 21 and 22 are fitted into the positioning holes 215a and 215b of the disk cartridge 200, thereby putting the disk cartridge 200 at the predetermined position and getting the disk cartridge 200 loaded so that a read/write operation is ready to be performed on the disk 10. At this point in time, the clamper holder 51 has turned most in the direction indicated by the arrow 51B and the first and second sliding members 71 and 72 have also traveled farthest in the direction indicated by the arrow 60B.

The disk cartridge 200 loaded can be ejected by performing the respective processing steps for inserting the disk cartridge 200 described above in reverse order. That is to say, the ejecting operation is started in the status shown in FIG. 4(c) and the disk cartridge 200 is gradually ejected out of the drive until the status shown in FIG. 4(a) is realized.

Specifically, if the cartridge holder 60 is turned in the direction indicated by the arrow 20A from the position shown in FIG. 4(c), the clamper holder 51 rotates in the direction indicated by the arrow 51A with respect to the cartridge holder 60 due to the engagement of the latching bosses 25 and 26 of the traverse base 20 with the catching portions 51e and 51f of the clamper holder 51. As described above, the first and second sliding members 71 and 72 and the clamper holder 51 turning form a link mechanism via the first and second connecting arms 81 and 82. That is why as the clamper holder 51 rotates in the direction indicated by the arrow 51A, the first and second sliding members 71 and 72 slide in the direction indicated by the arrow 60A, which in turn makes the first and second opening/closing levers 151 and 152 rotate in the directions indicated by the arrows 151A and 152A, respectively, as opposed to the inserting operation. As the cartridge holder 60 further turns in the direction indicated by the arrow 20A from the position shown in FIG. 4(b), the status shown in FIG. 4(a) is soon realized to complete the rotation of the clamper holder 51. As a result, the clamper is fully lifted and the disk cartridge 200 gets ready to be removed from the cartridge holder 60.

As described above, since the clamper holder 51 is supported rotatably by the cartridge holder 60 and is engaged with the latching bosses 25 and 26 of the traverse base 20, the clamper holder 51 rotates in the direction indicated by the arrow 51A or 51B synchronously with the rotation of the cartridge holder 60 in the direction indicated by the arrow 20A or 20B.

In addition, since the clamper holder 51, the first and second sliding members 71 and 72 and the first and second connecting arms 81 and 82 form a link mechanism, the first and second sliding members 71 and 72 slide in the direction indicated by the arrow 60A or 60B in synchronization with the rotation of the clamper holder 51 in the direction indicated by the arrow 51A or 51B. As will be described later, by sliding the first and second sliding members 71 and 72 and by reversing the directions in which the first and second lever biasing springs 153 and 154 apply the biasing force (which act as toggle springs), the first and second opening/closing levers 151 and 152 can be turned and the clamper 50 can be moved up and down synchronously with each other.

Figure 5:
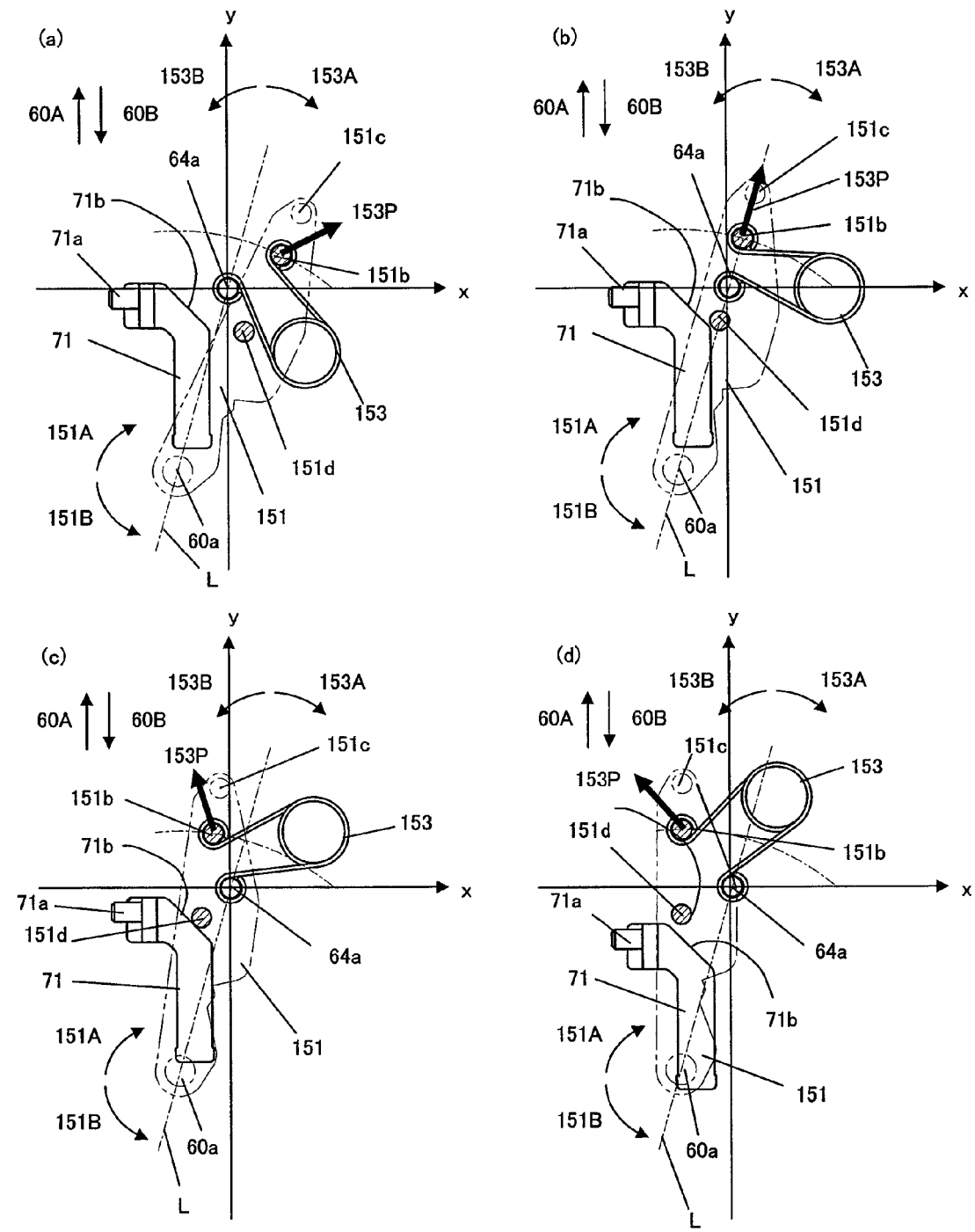
FIGS. 5(a) through 5(d) are plan views illustrating how the first lever biasing spring reverses its biasing direction as the first opening/closing lever rotates in the disk drive shown in FIG. 1.

FIG. 5 illustrates plan views showing how the first lever biasing spring 153 reverses the biasing direction as the first opening/closing lever 151 turns, wherein FIGS. 5(a) through 5(d) show the respective positions and biasing directions of the first lever biasing spring 153 while the disk cartridge 200 is being inserted or ejected. Hereinafter, it will be described with reference to these drawings how the toggle mechanism including the first and second opening/closing levers 151 and 152 works and how that mechanism works in synchronization with the first and second sliding members 71 and 72. It should be noted that FIG. 5 shows only the movements of the first opening/closing lever 151, the first lever biasing spring 153 and the first sliding member 71. However, as described above, the first and second opening/closing levers 151 and 152, the first and second lever biasing springs 153 and 154, and the first and second sliding members 71 and 72 are all arranged symmetrically to each other horizontally. That is why the second opening/closing lever 152, the second lever biasing spring 154 and the second sliding member 72 also move in the same way although not shown in FIG. 5.

It should be noted that the spring pivot 64a, defining the axis around which the first lever biasing spring 153 rotates, is fixed on the cartridge holder 60 and does not move at all. That is why x and y coordinates, which are defined with respect to the center of the spring pivot 64a as the origin, are superposed in these drawings so that the positions of the respective members can be seen easily.

FIG. 5(a) shows the positions of the first opening/closing lever 151, the first lever biasing spring 153 and the first sliding member 71 either before the disk cartridge 200 is inserted or after the disk cartridge 200 has just started to be inserted.

At this point in time, the biasing force applied by the first lever biasing spring 153 is indicated by the arrow 153P, and therefore, the first opening/closing lever 151 is biased in the direction indicated by the arrow 151A. As described above, as the spring pivots 151b and 152b contact with one end of the guide holes 60c and 60d (see FIG. 2), the first and second opening/closing levers 151 and 152 are held at their predetermined rest positions.

As the first opening/closing lever 151 turns in the direction indicated by the arrow 151B from the position shown in FIG. 5(a), the first lever biasing spring 153 rotates in the direction indicated by the arrow 153B around the spring pivot 64a of the cartridge holder 60 as shown in FIG. 5(b). As a result, the center of the spring pivot 151b of the first opening/closing lever 151 is aligned with the line segment L that connects together the respective centers of the pivot 60a and the spring pivot 64a. In that case, the first lever biasing spring 153 applies biasing force in the direction indicated by the arrow 153P shown in FIG. 5(b), which has become parallel to the line segment L. Consequently, no biasing force is applied to the first opening/closing lever 151 in any of the two directions indicated by the arrows 151A and 151B. Meanwhile, the contact portion 151d of the first opening/closing lever 151 contacts with the cam face 71b of the first sliding member 71 at this point in time.

As the first opening/closing lever 151 further turns in the direction indicated by the arrow 151B from the position shown in FIG. 5(b), the first lever biasing spring 153 rotates in the direction indicated by the arrow 153B around the spring pivot 64a of the cartridge holder 60 and the spring pivot 151b of the first opening/closing lever 151 also moves in the direction indicated by the arrow 153B away from the line segment L as shown in FIG. 5(c). In that case, the first lever biasing spring 153 applies biasing force in the direction indicated by the arrow 153P as shown in FIG. 5(c), and the first opening/closing lever 151 is biased to the direction indicated by the arrow 151B with that biasing force. That is to say, the biasing force applied to the first opening/closing lever 151 reverses its direction compared to the status shown in FIG. 5(a).

Meanwhile, as the first opening/closing lever 151 rotates in the direction indicated by the arrow 151B, the cam face 71b of the first sliding member 71, which forms part of the interlocking mechanism 90, is driven, thereby sliding the first sliding member 71 in the direction indicated by the arrow 60B as shown in FIG. 5(c). Since the biasing direction has reversed, the first opening/closing lever 151 now rotates in the direction indicated by the arrow 151B under the biasing force applied by the first lever biasing spring 153, thereby getting the disk cartridge 200 loaded as shown in FIG. 5(d). Meanwhile, the contact portion 151d gets out of contact with the cam face 71b.

On the other hand, to eject the disk cartridge 200, the first sliding member 71 moves in the direction indicated by the arrow 60A by turning the clamper holder 51 as described above.

Specifically, as the first sliding member 71 moves in the direction indicated by the arrow 60A from the position shown in FIG. 5(d), the cam face 71b of the first sliding member 71 soon contacts with the contact portion 151d of the first opening/closing lever 151 as shown in FIG. 5(c). And as the first sliding member 71 goes farther in the direction indicated by the arrow 60A, the cam face 71b of the first sliding member 71 gets the first opening/closing lever 151 to start to rotate in the direction indicated by the arrow 151A.

And as the first sliding member 71 goes even farther in the direction indicated by the arrow 60A from the position shown in FIG. 5(c), the first opening/closing lever 151 is kept rotated in the direction indicated by the arrow 151A by the first sliding member 71 until the first lever biasing spring 153 reverses its biasing direction as shown in FIG. 5(b). After the first lever biasing spring 153 has reversed the biasing direction, the first opening/closing lever 151 further rotates in the direction indicated by the arrow 151A under the biasing force applied by the first lever biasing spring 153 to reach the rest position shown in FIG. 5(a) soon.

As described above, as the first opening/closing lever 151 turns, the first lever biasing spring 153 rotates around the spring pivot 64a of the cartridge holder 60. As a result, the biasing force applied to the first opening/closing lever 151 reverses its biasing direction. Likewise, the second opening/closing lever 152, which is arranged symmetrically to the first opening/closing lever 151 horizontally, also performs a similar operation by making the second lever biasing spring 154 reverse its biasing direction in the same way. Consequently, the first and second opening/closing levers 151 and 152 form a toggle mechanism by taking advantage of the reversal of the biasing directions in which the first and second lever biasing springs 153 and 154 apply the biasing force.

Hereinafter, it will be described how the first and second opening/closing levers 151 and 152 open and close the disk housing using the function of that toggle mechanism. In the disk drive 500 of this preferred embodiment, the first and second opening/closing levers 151 and 152 perform the operation of opening the disk housing 220 as the disk cartridge 200 is being inserted into the cartridge holder 60 and also perform the operation of closing the disk housing 220 as the disk cartridge 200 is being ejected out of the cartridge holder 60.

It should be noted that the disk drive 500 of the present invention has no drive source for loading the disk cartridge 200 automatically. For that reason, the disk cartridge is manually inserted by the operator. On the other hand, the disk cartridge is ejected by using the biasing force applied by the first and second lever biasing springs 153 and 154 and then removed manually by the operator.

First, it will be described with reference to FIGS. 6 through 11 how the first and second opening/closing levers 151 and 152 open the disk housing of the disk cartridge 200 being inserted into the cartridge holder 60.

While the disk cartridge 200 is being inserted or ejected, the cartridge holder 60 is tilted with respect to the traverse base 20 as shown in FIG. 4(a). However, the traverse base 20 has nothing to do with the operation of opening or closing the disk cartridge 200 using the first and second opening/closing levers 151 and 152. For that reason, the cartridge holder 60 and the traverse base 20 are illustrated on the same plane in FIGS. 6 through 10 for the sake of convenience. And FIG. 11 illustrates a situation where the cartridge holder 60 has been loaded with the disk cartridge 200. In that state, the cartridge holder 60 is on a level with the traverse base 20 as shown in FIG. 4(c).

Figure 6:
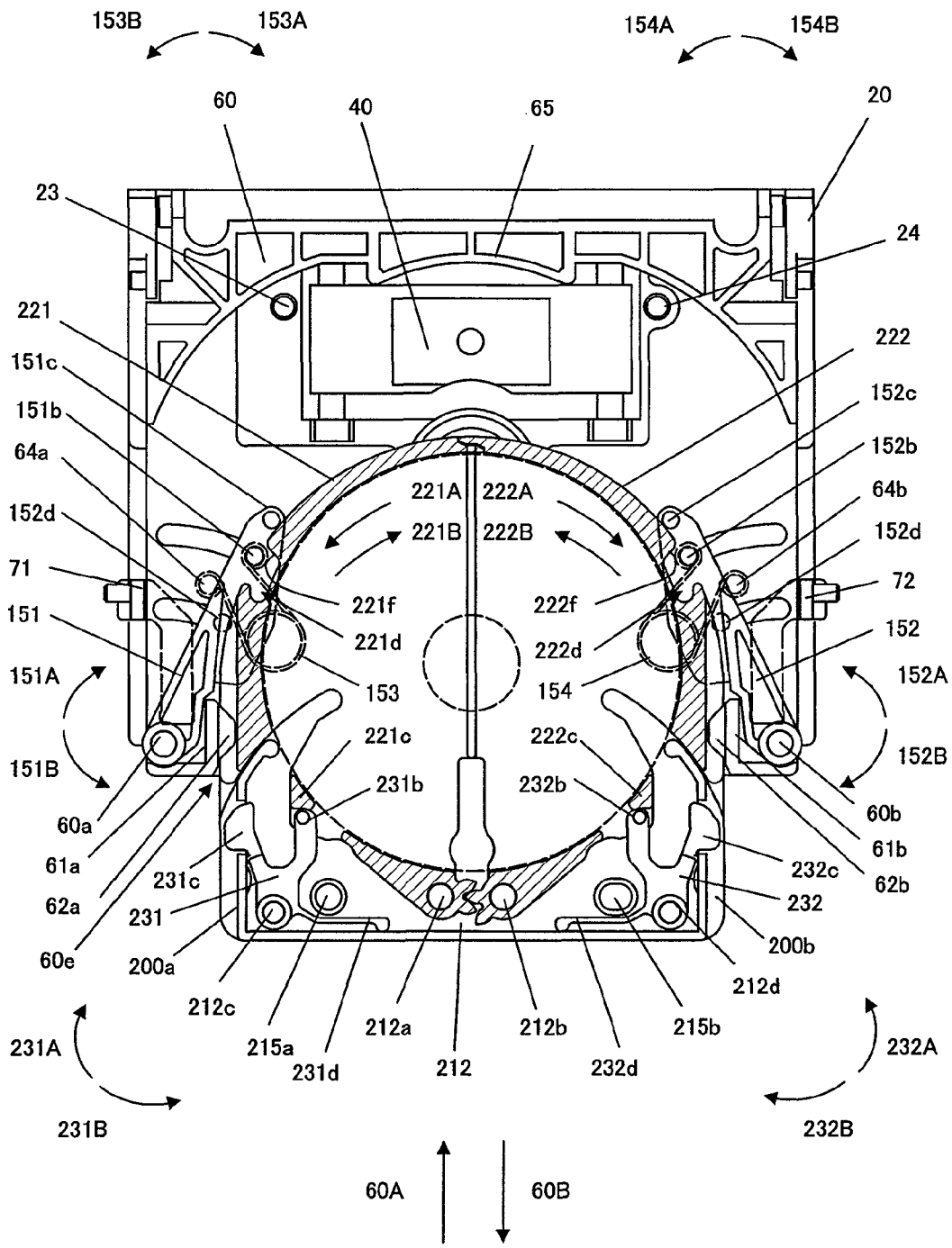
FIG. 6 is a plan view illustrating a status of the disk drive shown in FIG. 1 while the first and second opening/closing levers are performing an opening or closing operation.

First, as shown in FIG. 6, the operator manually inserts the disk cartridge 200 through the holder opening 60e of the cartridge holder 60 in the direction indicated by the arrow 60A. In this case, the disk cartridge 200 is inserted into the cartridge holder 60 while being guided by the guide walls 61a and 61b of the cartridge holder 60 in its width direction, i.e., in the direction that intersects with the inserting direction 60A at right angles.

By bringing the spring pivots 151b and 152b of the first and second opening/closing levers 151 and 152 into contact with one end of the guide holes 60c and 60d of the cartridge holder 60, the first and second opening/closing levers 151 and 152 are held at their rest positions so that the gap between the first and second engaging portions 151c and 152c thereof is narrower than the gap between the guide walls 61a and 61b. That is why when the disk cartridge 200 is inserted, the first and second engaging portions 151c and 152c soon contact with the outer surface of the first and second disk housing portions 221 and 222.

In the meantime, the unlocking portions 62a and 62b of the guide walls 61a and 61b respectively go through the unlocking slits 200a and 200b of the disk cartridge 200.

Meanwhile, the first and second lever biasing springs 153 and 154 are in the position shown in FIG. 5(a), and therefore, the biasing force of the first and second lever biasing springs 153 and 154 are applied in the directions indicated by the arrows 151A and 152A, respectively.

Figure 7:
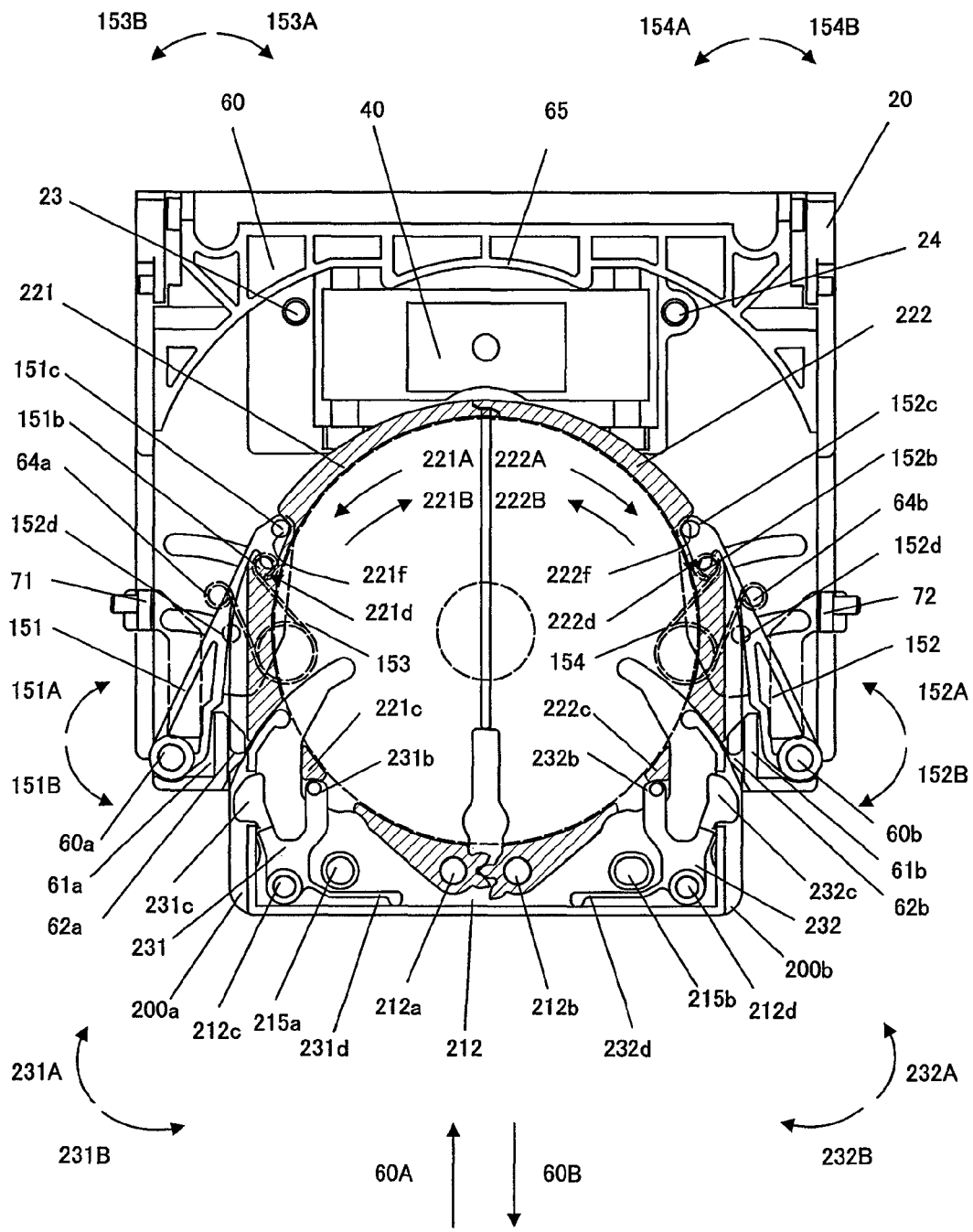
FIG. 7 is a plan view illustrating another status of the disk drive shown in FIG. 1 while the first and second opening/closing levers are performing the opening or closing operation.

As the disk cartridge 200 is inserted even deeper than the position shown in FIG. 6 in the direction indicated by the arrow 60A, the first opening/closing lever 151 has the first engaging portion 151c thereof soon contact with the outer side surface of the first disk housing portion 221 as shown in FIG. 7 to overcome the biasing force applied by the first lever biasing spring 153 and rotate around the pivot 60a in the direction indicated by the arrow 151B. Thereafter, the first opening/closing lever 151 rotates in the direction indicated by the arrow 151A under the biasing force applied by the first lever biasing spring 153 to reach a position where the first engaging portion 151b contacts with the catching contact face 221f of the notch 221d of the first disk housing portion 221.

In the same way, the second opening/closing lever 152 has the engaging portion 152c thereof soon contact with the outer side surface of the second disk housing portion 222 to overcome the biasing force applied by the second lever biasing spring 154 and rotate around the pivot 60b in the direction indicated by the arrow 152B. Thereafter, the second opening/closing lever 152 rotates in the direction indicated by the arrow 152A under the biasing force applied by the second lever biasing spring 154 to reach a position where the second engaging portion 152b contacts with the catching contact face 222f of the notch 222d of the second disk housing portion 222.

Figure 8:
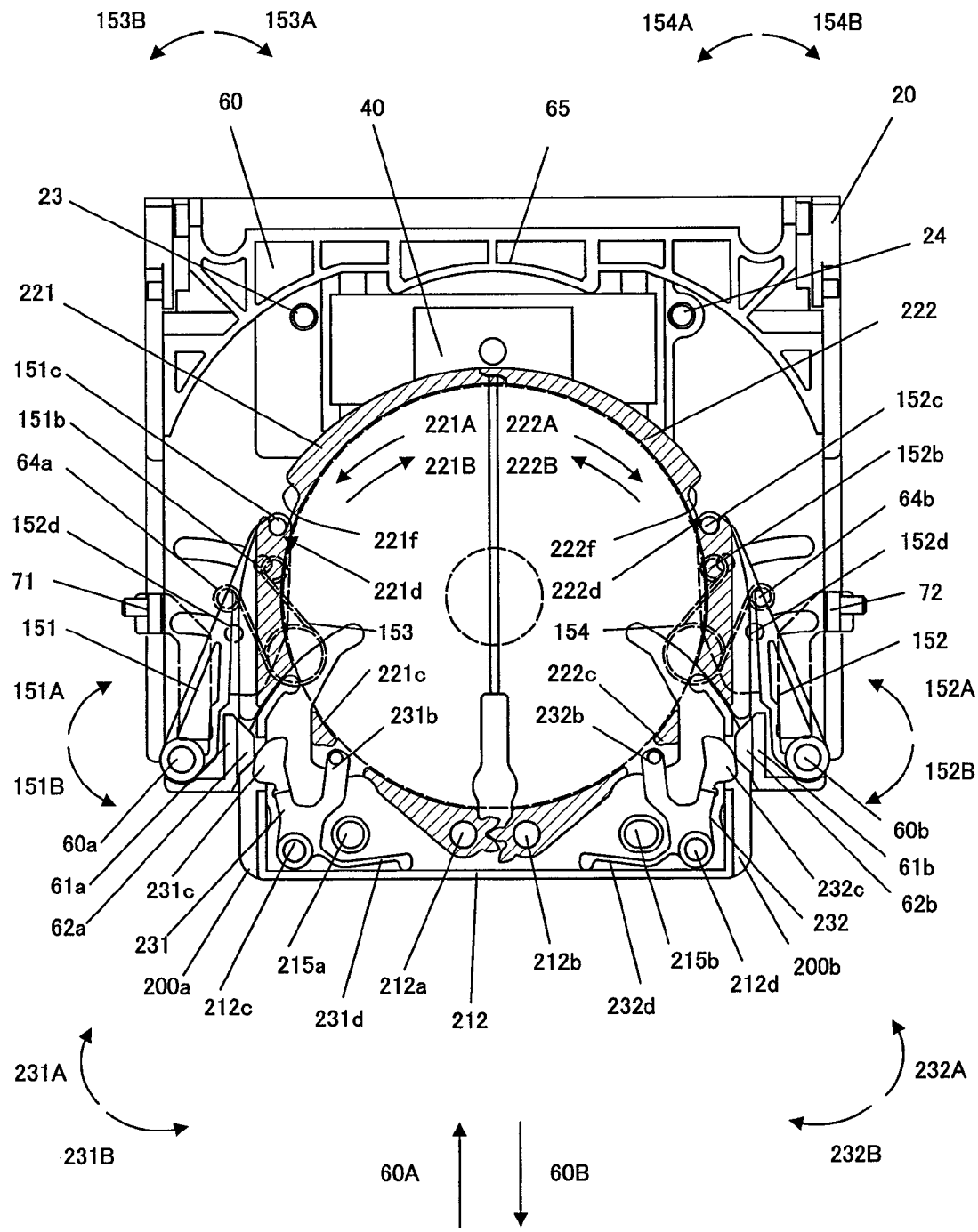
FIG. 8 is a plan view illustrating still another status of the disk drive shown in FIG. 1 while the first and second opening/closing levers are performing the opening or closing operation.

As the disk cartridge 200 is inserted even deeper than the position shown in FIG. 7 in the direction indicated by the arrow 60A, the first engaging portion 151c of the first opening/closing lever 151 further goes on the inner wall of the notch 221d of the first disk housing portion 221 under the biasing force applied by the first lever biasing spring 153 to reach the semicircular catching portion 221e of the notch 221d and get latched there as shown in FIG. 8. As a result, the first opening/closing lever 151 and the first disk housing portion 221 form a first link mechanism.

In the same way, the engaging portion 152c of the second opening/closing lever 152 further goes on the inner wall of the notch 222d of the second disk housing portion 222 under the biasing force applied by the second lever biasing spring 154 to reach the semicircular catching portion 222e of the notch 222d and get latched there. As a result, the second opening/closing lever 152 and the second disk housing portion 222 form a second link mechanism.

In the meantime, the unlocking portions 62a and 62b press the operation portions 231c and 232c of the first and second locking members 231 and 232 at the same time, thereby turning the first and second locking members 231 and 232 in the directions indicated by the arrows 231A and 232A, respectively, while deforming their elastic portions 231d and 232d simultaneously. As a result, the catching lever portions 231b and 232b of the first and second locking members 231 and 232 disengage themselves from the latching portions 221c and 222c of the first and second disk housing portions 221 and 222, thereby unlocking the first and second disk housing portions 221 and 222. As a result, the first and second disk housing portions 221 and 222 are now ready to rotate in the directions indicated by the arrows 221A and 222A, respectively.

Figure 9:
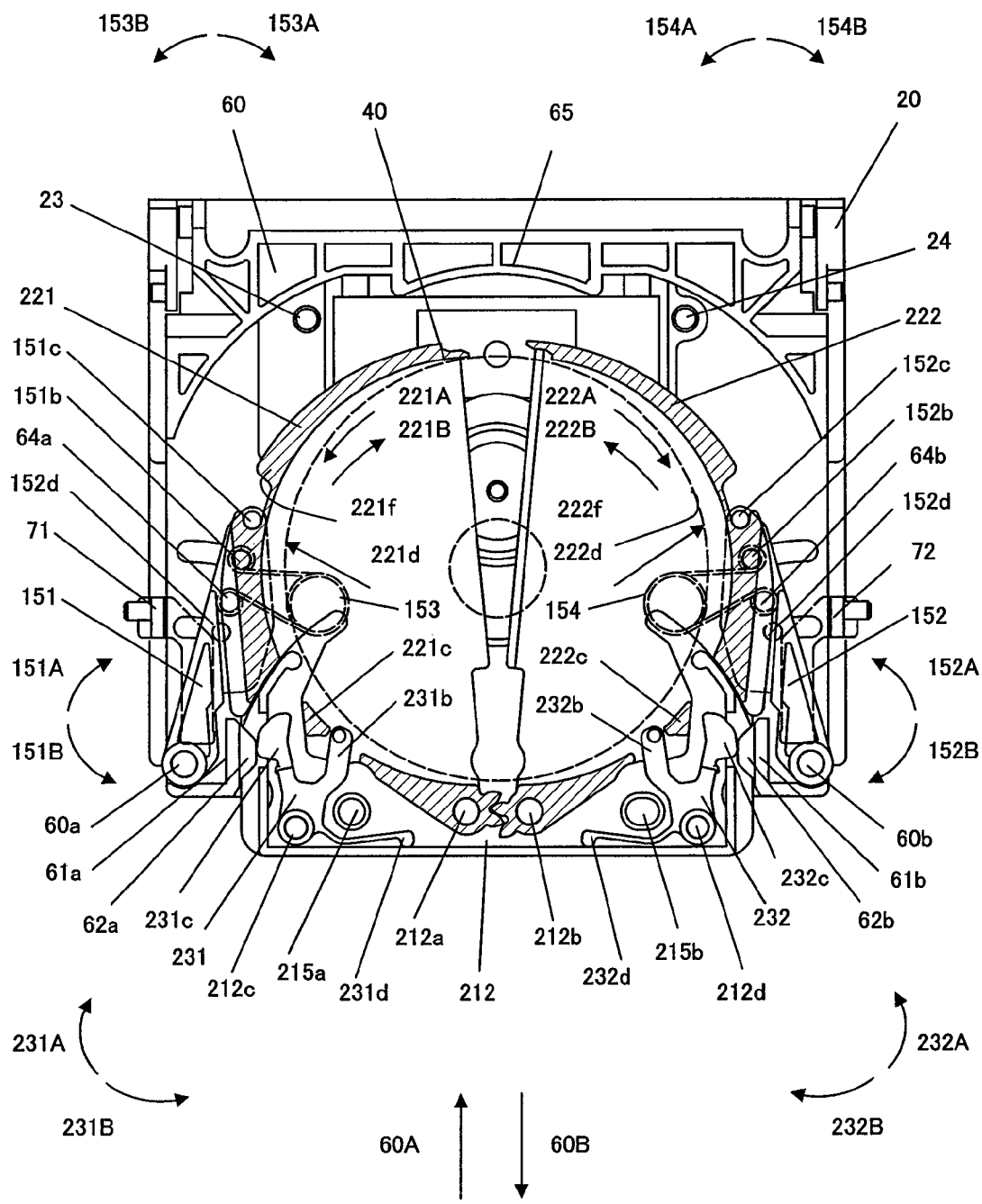
FIG. 9 is a plan view illustrating yet another status of the disk drive shown in FIG. 1 while the first and second opening/closing levers are performing the opening or closing operation.

As the disk cartridge 200 is inserted even deeper than the position shown in FIG. 8 in the direction indicated by the arrow 60A, the first and second opening/closing levers 151 and 152 start being rotated around their pivots 60a and 60b in the directions indicated by the arrows 151B and 152B, respectively, by the first link mechanism formed by the first opening/closing lever 151 and the first disk housing portion 221 and by the second link mechanism formed by the second opening/closing lever 152 and the second disk housing portion 222 as shown in FIG. 9. Meanwhile, the first and second disk housing portions 221 and 222 start rotating around their pivots 212a and 212b in the directions indicated by the arrows 221A and 222A, respectively.

More specifically, the lower supporting base portion 212 is guided by the guide walls 61a and 61b in the directions indicated by the arrows 60A and 60B. Therefore, the pivot 212a of the first disk housing portion 221 can move only in the directions indicated by the arrows 60A and 60B. On the other hand, the pivot 60a of the first opening/closing lever 151 is fixed. As a result, a first link mechanism is formed by the first opening/closing lever 151 and the first disk housing portion 221. This first link mechanism is made up of the first opening/ closing lever 151 that performs a crank (rotation) operation, the pivot 212a of the first disk housing portion 221 that performs the slide operation in the inserting direction indicated by the arrow 60A, and the first disk housing portion 221 that functions as an interconnect link. And as the first opening/closing lever 151 turns in the direction indicated by the arrow 151B, the first disk housing portion 221 rotates in the direction indicated by the arrow 221A.

As the lower supporting base portion 212 is guided by the guide walls 61a and 61b in the directions indicated by the arrows 60A and 60B, the pivot 212b of the second disk housing portion 222 can also move only in the directions indicated by the arrows 60A and 60B. On the other hand, the pivot 60b of the second opening/closing lever 152 is fixed. As a result, a second link mechanism is formed by the second opening/closing lever 152 and the second disk housing portion 222. This second link mechanism is made up of the second opening/closing lever 152 that performs a crank operation, the pivot 212b of the second disk housing portion 222 that performs the slide operation in the inserting direction indicated by the arrow 60A, and the second disk housing portion 222 that functions as an interconnect link. And as the second opening/closing lever 152 turns in the direction indicated by the arrow 152B, the second disk housing portion 222 rotates in the direction indicated by the arrow 222A.

Thus, as the first and second opening/closing levers 151 and 152 rotate in the directions indicated by the arrows 151B and 152B, respectively, the two halves of the disk housing 220 rotate in the directions indicated by the arrows 221A and 222A, respectively, using the first and second link mechanisms, thereby opening the disk housing 220. In this case, the angle of rotation is determined according to how deep the disk cartridge 200 is inserted in the direction indicated by the arrow 60A.

Also, in this case, as the first and second disk housing portions 221 and 222 rotate in mutually opposite directions synchronously with each other at the interlocking portions 221b and 222b that engage with each other, the first and second opening/closing levers 151 and 152 also rotate in mutually opposite directions via the first and second disk housing portions 221 and 222.

Meanwhile, the first and second opening/closing levers 151 and 152 are arranged symmetrically to each other with respect to the direction in which the disk cartridge 200 is inserted (i.e., the direction indicated by the arrow 60A). That is why the first link mechanism formed by the first opening/closing lever 151 and the first disk housing portion 221 and the second link mechanism formed by the second opening/closing lever 152 and the second disk housing portion 222 operate symmetrically to each other with respect to the direction in which the disk cartridge 200 is inserted (i.e., the direction indicated by the arrow 60A). Consequently, it is possible to guarantee that the disk cartridge 200 being inserted goes straight in its inserting direction.

In the meantime, portions of the first and second opening/closing levers 151 and 152 near the first and second engaging portions 151c and 152c contact with, and support, the bottom of the first and second disk housing portions 221 and 222. In this manner, while the disk cartridge 200 is being inserted in the direction indicated by the arrow 60A, the first and second disk housing portions 221 and 222 can be guided in the height direction.

Consequently, the first and second opening/closing levers 151 and 152 make sure that the disk cartridge 200 being inserted goes straight and guide the disk cartridge 200 in the height direction. As a result, the disk housing 220 can be opened with stability.

The status shown in FIG. 9 corresponds to the one shown in FIG. 5(b). Therefore, since the disk cartridge 200 started being inserted as shown in FIG. 6 and until the status shown in FIG. 9 is realized, the first and second lever biasing springs 153 and 154 apply biasing force to the first and second opening/closing levers 151 and 152 in the directions indicated by the arrows 153B and 154B. In the status shown in FIG. 9, the biasing force is applied by the first and second lever biasing springs 153 and 154 in such directions in which neither the first nor second opening/closing levers 151 nor 152 rotates.

Figure 10:
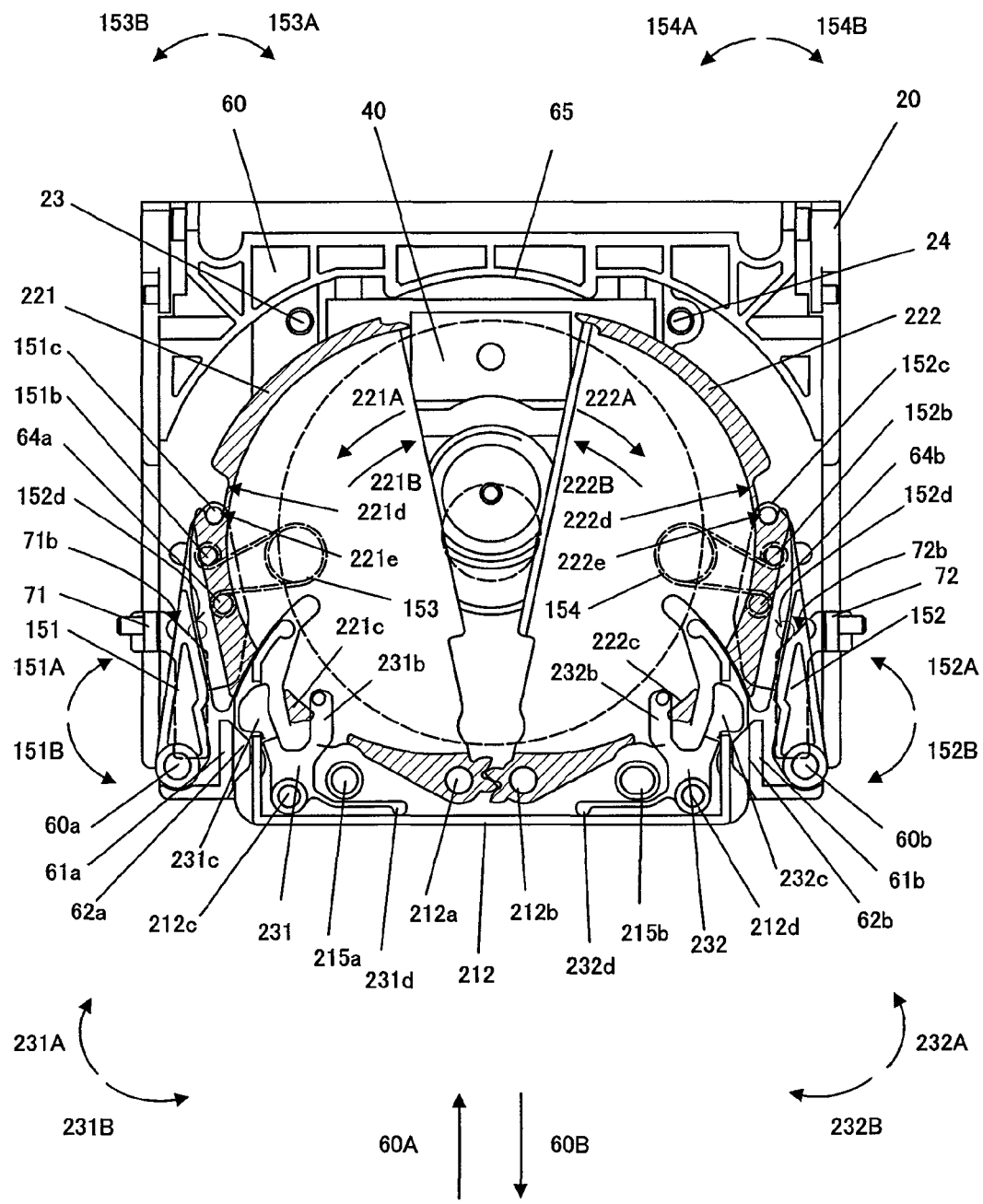
FIG. 10 is a plan view illustrating yet another status of the disk drive shown in FIG. 1 while the first and second opening/closing levers are performing the opening or closing operation.
Figure 11:
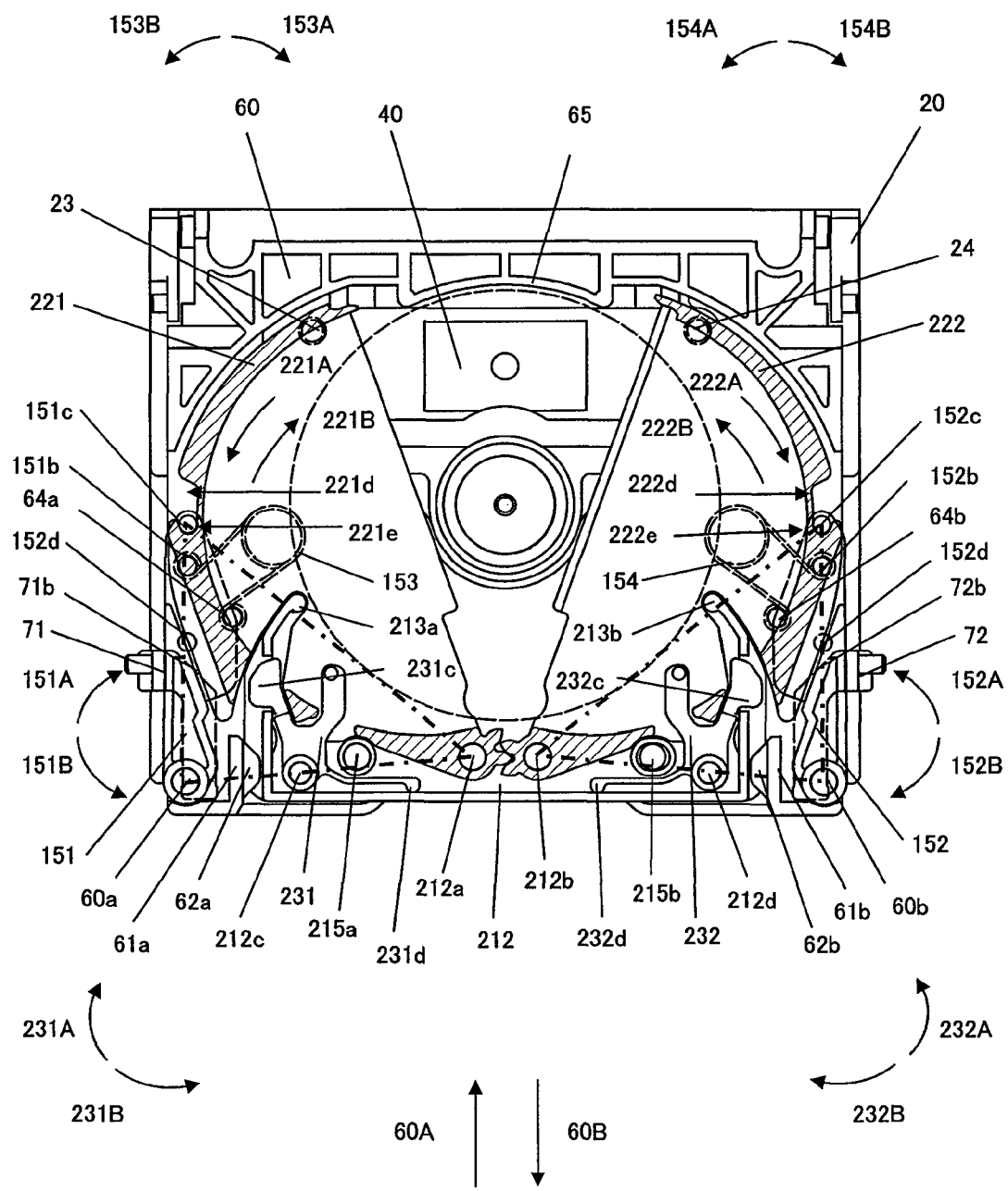
FIG. 11 is a plan view illustrating yet another status of the disk drive shown in FIG. 1 while the first and second opening/closing levers are performing the opening or closing operation.

Next, as the disk cartridge 200 is inserted even deeper in the direction indicated by the arrow 60A than the position shown in FIG. 9, the first and second disk housing portions 221 and 222 rotate in the directions indicated by the arrows 221A and 222A, and the first and second opening/closing levers 151 and 152 turn in the directions indicated by the arrows 151B and 152B as shown in FIG. 10. As a result, the first and second lever biasing springs 153 and 154 reverse their biasing directions as already described with reference to FIG. 5(c). When the biasing directions of the first and second lever biasing springs 153 and 154 reverse, the first and second opening/closing levers 151 and 152 start to rotate in the directions indicated by the arrows 151B and 152B under the biasing forces applied by the first and second opening/closing levers 151 and 152. Meanwhile, the disk cartridge 200 is inserted in the direction indicated by the arrow 60A.

In the meantime, the contact portions 151d and 152d of the first and second opening/closing levers 151 and 152 contact with the cam faces 71b and 72b of the first and second sliding members 71 and 72, respectively.

Next, as the disk cartridge 200 is inserted even deeper in the direction indicated by the arrow 60A than the position shown in FIG. 10, the first and second opening/closing levers 151 and 152 turn in the directions indicated by the arrows 151B and 152B and the first and second sliding members 71 and 72 start to slide in the direction indicated by the arrow 60B. As a result of this slide operation, the clamper holder 51 rotates in the direction indicated by the arrow 51B as shown in FIG. 4(a), thereby moving the clamper 50 down and making a transition from the status shown in FIG. 4(a) into the one shown in FIG. 4(b).

And as the disk cartridge 200 is inserted even deeper into the cartridge holder 60 as shown in FIG. 11, the first and second disk housing portions 221 and 222 rotate to form a predetermined angle between them, thereby opening the window 220w.

At this point in time, the positioning portion 65 of the cartridge holder 60 enters the window 220w. Also, the position regulating portions 213a and 213b of the lower supporting base portion 212 and the positioning portion 65 contact with the outer side surface of the disk 10, thereby positioning the center of the disk 10 when the window 220w is opened.

Meanwhile, the first and second lever biasing springs 153 and 154 reverse their biasing directions to start biasing the first and second opening/closing levers 151 and 152 in the directions indicated by the arrows 151B and 152B. As a result, the disk cartridge 200 gets fully inserted and held by the cartridge holder 60 as shown in FIG. 11.

When the operator turns the cartridge holder 60, which holds the disk cartridge 200 and which forms a predetermined tilt angle θ2 as shown in FIG. 4(b), in the direction indicated by the arrow 20B as shown in FIG. 4(c), the cartridge positioning pins 21 and 22 of the traverse base 20 fit into the positioning holes 215a and 215b of the lower supporting base portion 212. As a result, the lower supporting base portion 212 is positioned with respect to the traverse base 20. At the same time, the pivots 212a and 212b, around which the first and second disk housing portions 221 and 222 turn, are also positioned with respect to the traverse base 20.

In this manner, the pivot 212a of the first disk housing portion 221 that has been movable in the directions indicated by the arrows 60A and 60B is fixed at the predetermined position. As a result, as indicated by the one-dot chain in FIG. 11, a first three-node link (truss structure) is formed by the pivot 60a of the first opening/closing lever 151, the pivot 212a of the first disk housing portion 221 and the catching portion 221e of the first disk housing portion 221. Consequently, the catching portion 221e of the first disk housing portion 221 has its position defined unequivocally with respect to the traverse base 20.

In the same way, the pivot 212b of the second disk housing portion 222 that has been movable in the directions indicated by the arrows 60A and 60B is fixed at the predetermined position. As a result, as indicated by the one-dot chain in FIG. 11, a second three-node link is formed by the pivot 60b of the second opening/closing lever 152, the pivot 212b of the second disk housing portion 222 and the catching portion 222e of the second disk housing portion 222. Consequently, the catching portion 222e of the second disk housing portion 222 has its position defined unequivocally with respect to the traverse base 20.

Thus, by positioning the lower supporting base portion 212 with respect to the traverse base 20, the first and second opening/closing levers 151 and 152 and the first and second disk housing portions 221 and 222 are positioned uniquely with respect to the traverse base 20 by the first and second three-node link mechanisms described above. As a result, the axes of rotation of the first and second disk housing portions 221 and 222 and their angles of rotation are defined unequivocally with respect to the traverse base 20 and the window 220w is opened fully.

Nevertheless, as long as the first and second lever biasing springs 153 and 154 keep applying biasing force to the first and second opening/closing levers 151 and 152 only in the directions indicated by the arrows 151A and 152A, the first and second disk housing portions 221 and 222 will be biased in such a direction as to close the window 220w when the window 220w is fully opened. Considering a possible variation in precision between the respective members, the window 220w could not be opened fully.

For that reason, in this disk drive 500, the first and second lever biasing springs 153 and 154 reverse their biasing directions as described above such that the first and second opening/closing levers 151 and 152 are biased in the directions indicated by the arrows 151B and 152B by the first and second lever biasing springs 153 and 154, respectively. That is to say, the first and second opening/closing levers 151 and 152 are always biased so as to widen the window 220w. Consequently, the variation in such a direction as to close the window 220w can be reduced and even if there is some variation in precision between the respective members, the area of window 220w can be kept as large as possible.

Furthermore, the first and second opening/closing levers 151 and 152 bias the first and second disk housing portions 221 and 222 in the directions indicated by the arrows 221B and 222B, respectively, with the first and second lever biasing springs. That is why even if the disk cartridge 200 is subjected to vibrations, shocks or any other disturbance, the window 220w can be kept fully opened just as intended.

In this case, the disk 10 gets clamped between the clamper 50 and the turntable 30a of the disk motor 30 by rotating the clamper holder 51 in the direction indicated by the arrow 51B and can be rotated by the disk motor 30 as shown in FIG. 4(c).

The position regulating portions 213a and 213b of the lower supporting base portion 212 are also positioned with respect to the traverse base 20. As a result, the disk 10 can be provided with required clearance and is now ready to rotate.

Also, since the cartridge holder 60 is supported by, and rotatable around, the shafts 60p and 60q with respect to the traverse base 20, the positioning portion 65 of the cartridge holder 60 has been positioned accurately with respect to the traverse base 20.

Furthermore, the bottom of the lower supporting base portion 212 is supported on the bearing surfaces 21a and 22a of the cartridge positioning pins 21 and 22, while the bottom of the first and second disk housing portions 221 and 222 is supported on the bearing surfaces 23a and 24a of the fixing pins 23 and 24 on the traverse base 20. At this point in time, the portions of the first and second opening/closing levers 151 and 152 near the first and second engaging portions 151c and 152c, which have been in contact with the bottom of the first and second disk housing portions 221 and 222 and have guided the first and second disk housing portions 221 and 222 in the height direction, are no longer in contact with the bottom of the first and second disk housing portions 221 and 222.

That is to say, when a read/write operation is ready to be performed on the disk 10, the disk cartridge 200 is supported on only the four bearing surfaces described above. For that reason, the disk cartridge 200 can be accurately positioned vertically with respect to the traverse base 20 and required clearance can be left just as intended for the disk 10. Optionally, the disk drive 500 may further include biasing springs (not shown) for pressing the disk cartridge 200 against the four bearing surfaces described above. In that case, the disk cartridge 200 can be positioned vertically even more accurately.

Also, as shown in FIG. 11, when a read/write operation is performed on the disk 10, the unlocking portions 62a and 62b are out of contact with the operation portions 231c and 232c of the first and second locking members 231 and 232. That is why the elastic portions 231d and 232d of the first and second locking members 231 and 232 do not deform elastically. Consequently, even if each of the first and second locking members 231 and 232 is an integral member made of resin, it is still possible to prevent the elastic portions 231d and 232d from creeping.

Furthermore, when the first and second disk housing portions 221 and 222 are fully opened, the pivots 60a and 60b of the first and second opening/closing levers 151 and 152 are located outside of the projection area of the disk cartridge 200 as shown in FIG. 11. That is why the first and second opening/closing levers 151 and 152 can be arranged efficiently without interfering with the disk cartridge 200 in the disk drive 500 and within the area defined by the maximum width of the disk cartridge 200 opened. As a result, a broad area can be secured for the window 220w, the optical head 40 can be designed more flexibly, and the thickness and overall size of the disk drive 500 can be cut down such that the disk drive 500 does not occupy too much space.

It should be noted that normally the disk drive 500 is designed so as to allow the disk cartridge 200 being inserted into the disk drive 500 a slightly greater stroke in the direction indicated by the arrow 60A (i.e., such that the disk cartridge 200 is inserted a little deeper than its loaded position). For that reason, if the disk 10 were centered only with the cartridge body 101 as in the conventional disk cartridge 100 shown in FIG. 17, then the disk 10 being inserted would be positioned slightly deeper by that excessive stroke, thus possibly causing some variation in positioning accuracy depending on how deep the disk 10 has been inserted. However, according to this preferred embodiment, the cartridge holder 60 includes the positioning portion 65 for centering the disk 10 in the deep area of the disk drive 500. That is why even if the disk cartridge 200 has been inserted to varied depths in the direction indicated by the arrow 60A, the disk 10 can still be centered accurately with respect to the disk drive 500.

As described above, by inserting the disk cartridge 200 in the direction indicated by the arrow 60A such that the disk cartridge 200 changes its positions from the one shown in FIG. 6 through the one shown in FIG. 11, the window 220w of the disk cartridge 200 is fully opened and the first and second opening/closing levers 151 and 152 finish their opening operation.

Next, it will be described how the first and second opening/closing levers 151 and 152 perform their closing operation as the disk cartridge 200 loaded is gradually ejected from the cartridge holder 60.

The first and second opening/closing levers 151 and 152 perform their closing operation in reverse order compared to their opening operation described above. That is to say, the first and second opening/closing levers 151 and 152 start operating in the state shown in FIG. 11 and eventually performs the operation of ejecting the disk cartridge 200 in the direction indicated by the arrow 60B to assume the state shown in FIG. 6. As a result, the disk housing 220 is fully closed and the disk cartridge 200 is ejected out of the disk drive.

First, in the state shown in FIG. 11, the operator turns the cartridge holder 60 in the direction indicated by the arrow 20A such that the disk cartridge 200 loaded as shown in FIG. 4(c) gets ready to be inserted or ejected as shown in FIG. 4(a). As a result, the cartridge positioning pins 21 and 22 that have been fitted into the positioning holes 215a and 215b of the lower supporting base portion 212 get disengaged from the holes 215a and 215b, thereby canceling the first and second three-node linked states described above. Consequently, the disk cartridge 200 can move in the directions indicated by the arrows 60A and 60B along the guide walls 61a and 61b of the cartridge holder 60.

As also described above, as the cartridge holder 60 rotates in the direction indicated by the arrow 20A, the clamper holder 51 rotates in the direction indicated by the arrow 51A. Consequently, synchronously with the rotation of the clamper holder 51, the link mechanism formed by the clamper holder 51 and the first and second sliding members 71 and 72 starts to move the first and second sliding members 71 and 72 in the direction indicated by the arrow 60A.

As the cartridge holder 60 and the clamper holder 51 rotate in the directions indicated by the arrows 20A and 51A, respectively, the clamper 50 is lifted and the first and second sliding members 71 and 72 further move in the direction indicated by the arrow 60A. As a result, the cam faces 71b and 72b of the first and second sliding members 71 and 72 contact with the contact portions 151d and 152d of the first and second opening/closing levers 151 and 152. Having contacted with the cam faces 71b and 72b, the first and second opening/closing levers 151 and 152 overcome the biasing forces applied by the first and second lever biasing springs 153 and 154 and start to rotate in the directions indicated by the arrows 151A and 152A, respectively.

As shown in FIG. 10, as the first and second opening/closing levers 151 and 152 rotate in the directions indicated by the arrows 151A and 152A, respectively, the disk housing 220 is gradually closed by the link mechanisms formed by the first and second opening/closing levers 151 and 152 and the first and second disk housing portions 221 and 222. In the meantime, the disk cartridge 200 is ejected in the direction indicated by the arrow 60B while being guided by the guide walls 61a and 61b.

In this case, as in the opening operation described above, the first and second disk housing portions 221 and 222 rotate in mutually opposite directions synchronously with each other via the interlocking portions 221b and 222b. In addition, since the first and second opening/closing levers 151 and 152 are arranged symmetrically with respect to the direction in which the disk cartridge 200 is ejected (i.e., the direction indicated by the arrow 60B), the disk cartridge 200 can move straight in the ejecting direction 60B just as intended even during the ejecting operation.

Also, as in the opening operation described above, portions of the first and second opening/closing levers 151 and 152 near the first and second engaging portions 151c and 152c contact with, and support, the bottom of the first and second disk housing portions 221 and 222. In this manner, while the disk cartridge 200 is being ejected in the direction indicated by the arrow 60B, the first and second disk housing portions 221 and 222 can be guided in the height direction.

At this point in time, the first and second locking members 231 and 232 of the disk cartridge 200 are out of contact with the unlocking portions 62a and 62b. However, as the first and second disk housing portions 221 and 222 rotate in the directions indicated by the arrows 221B and 222B, the latching portions 221c and 222c of the first and second disk housing portions 221 and 222 contact with the catching lever portions 231b and 232b of the first and second locking members 231 and 232, thereby turning the first and second locking members 231 and 232 in the directions indicated by the arrows 231A and 232A.

In this preferred embodiment, in such a state, the timing to operate the link mechanism is determined such that the clamper holder 51 rotates in the direction indicated by the arrow 51A to reach the position shown in FIG. 4(b). As a result, the clamper 50 can be lifted without interfering with the window 220w being closed.

As the clamper holder 51 further rotates in the direction indicated by the arrow 51A and as the first and second sliding members 71 and 72 go farther in the direction indicated by the arrow 60A from their positions shown in FIG. 10, the contacting portions 151d and 152d of the first and second opening/closing levers 151 and 152 contact with the cam faces 71b and 72b of the first and second sliding members 71 and 72, thereby rotating the first and second opening/closing levers 151 and 152 in the directions indicated by the arrows 151A and 152A and realizing the status shown in FIG. 9. This status corresponds to the one shown in FIG. 5(b). And the first and second opening/closing levers 151 and 152 have rotated to reach their neutral positions where biasing forces are not applied by the first and second lever biasing springs 153 and 154 in such direction as to rotate the first and second opening/closing levers 151 and 152.

And as the clamper holder 51 further rotates in the direction indicated by the arrow 51A and as the first and second sliding members 71 and 72 go even farther in the direction indicated by the arrow 60A from their positions shown in FIG. 9, the first and second lever biasing springs 153 and 154 soon reverse their biasing directions. As a result, under the biasing forces applied by the first and second lever biasing springs 153 and 154, the first and second opening/closing levers 151 and 152 rotate in the directions indicated by the arrows 151A and 152A and the disk cartridge 200 is ejected in the direction indicated by the arrow 60B while closing its disk housing 220. Consequently, as shown in FIG. 8, the window 220w is fully closed by the disk housing 220.

In this manner, the contact of the cam faces 71*b* and 72*b* of the first and second sliding members 71 and 72 with the contacting portions 151*d* and 152*d* of the first and second opening/closing levers 151 and 152 gets the operation of closing the disk housing 220 of the disk cartridge 200 started. That is why by operating the first and second sliding members 71 and 72 that drive the first and second opening/closing levers 151 and 152 in the directions indicated by the arrows 151A and 152A and the clamper holder 51 that rotates in the direction indicated by the arrow 51A synchronously with each other via the link mechanisms, it is not until the clamper 50 is lifted and retracted from the window 220*w* of the disk cartridge 200 that the disk housing 220 starts to be closed. As a result, it is possible to avoid an unwanted situation where the clamper 50 is sandwiched by the disk housing 220 to prevent the user from ejecting the disk cartridge 200.

At this point in time, the unlocking portions 62*a* and 62*b* are in contact with the operation portions 231*c* and 232*c* of the first and second locking members 231 and 232, thus rotating the first and second locking members 231 and 232 in the directions indicated by the arrows 231A and 232A. That is why the first and second disk housing portions 221 and 222 are not locked but can rotate in the directions indicated by the arrows 221A and 222A, respectively.

In the state shown in FIG. 8, the first and second opening/closing levers 151 and 152 continue to rotate in the directions indicated by the arrows 151A and 152A, respectively, under the biasing force applied by the first and second lever biasing springs 153 and 154. As a result, the disk cartridge 200 is gradually ejected in the direction indicated by the arrow 60B while the first and second engaging portions 151*c* and 152*c* of the first and second opening/closing levers 151 and 152 are keeping in contact with the inner wall of the notches 221*d* and 222*d* of the first and second disk housing portions 221 and 222.

Then, as shown in FIG. 7, the first and second engaging portions 151*c* and 152*c* of the first and second opening/closing levers 151 and 152 contact with the catching contact faces 221*f* and 222*f* of the notches 221*d* and 222*d* of the first and second disk housing portions 221 and 222. As a result, the disk cartridge 200 is completely ejected in the direction indicated by the arrow 60B under the biasing force applied by the first and second lever biasing springs 153 and 154.

The contact of the first and second engaging portions 151*c* and 152*c* with the catching contact faces 221*f* and 222*f* prevents the disk cartridge 200 from popping out in the direction indicated by the arrow 60B and dropping out of the disk drive 500 due to the biasing force applied by the first and second lever biasing springs 153 and 154.

If each of the first and second opening/closing levers 151 and 152 were biased in one direction (i.e., in the directions indicated by the arrows 151A and 152A) with normal biasing springs, the biasing force applied in the directions indicated by the arrows 151A and 152A would be the maximum in the state shown in FIG. 11. In the disk drive of the present invention, however, the first and second lever biasing springs 153 and 54 are springs with reversing biasing directions. That is why the biasing force applied by the first and second lever biasing springs 153 and 154 in the directions indicated by the arrows 151A and 152A becomes the maximum in the standby state shown in FIG. 2. As a result, while in contact with these catching contact faces 221*f* and 222*f*, the disk cartridge 200 can be held more firmly and is less likely to drop out of the disk drive 500 as shown in FIG. 7.

At this point in time, the operation portions 231*c* and 232*c* of the first and second locking members 231 and 232 are out of contact with the unlocking portions 62*a* and 62*b*, respectively. Thus, under the elastic force applied by the elastic portions 231*d* and 232*d*, the first and second locking members 231 and 232 rotate in the directions indicated by the arrows 231B and 232B. As a result, the latching portions 221*c* and 222*c* of the first and second disk housing portions 221 and 222 get engaged with the catching lever portion 231*b* and 232*b* of the first and second locking members 231 and 232, respectively. Consequently, the first and second disk housing portions 221 and 222 are locked so as not to rotate in the directions indicated by the arrows 221A and 222A.

When the operator removes the disk cartridge 200 in the direction indicated by the arrow 60B in the state shown in FIG. 7, the first and second opening/closing levers 151 and 152 overcome the biasing force applied by the first and second lever biasing springs 153 and 154 to rotate in the directions indicated by the arrows 151B and 152B, respectively. Consequently, the first and second engaging portions 151*c* and 152*c* of the first and second opening/closing levers 151 and 152 move while sliding on the catching contact faces 221*f* and 222*f* of the first and second disk housing portions 221 and 222.

As a result, as shown in FIG. 6, the first and second engaging portions 151*c* and 152*c* of the first and second opening/closing levers 151 and 152 are disengaged from the catching contact faces 221*f* and 222*f* of the first and second disk housing portions 221 and 222 to contact with the outer side surface of the first and second disk housing portions 221 and 222 instead. Consequently, the disk cartridge 200 is no longer held and can be removed from the cartridge holder 60.

Finally, when the operator removes the disk cartridge 200 in the direction indicated by the arrow 60B, the disk cartridge 200 is completely ejected from the cartridge holder 60 and the operation of closing the first and second opening/closing levers 151 and 152 ends.

In the preferred embodiment described above, the operation of ejecting the disk cartridge 200 from the position shown in FIG. 8 to the one shown in FIG. 7 gets done by making the first and second opening/closing levers 151 and 152 rotate continuously in the directions indicated by the arrows 151A and 152A, respectively, under the biasing force applied by the first and second lever biasing springs 153 and 154. However, depending on the balance between the biasing force applied by the first and second lever biasing springs 153 and 154 and the frictional force caused by the first and second engaging portions 151*c* and 152*c* of the first and second opening/closing levers 151 and 152 on the inner wall of the notches 221*d* and 222*d* of the first and second disk housing portions 221 and 222, the ejection of the disk cartridge 200 in the direction indicated by the arrow 60B under the biasing force applied by the first and second lever biasing springs 153 and 154 could finish at the stage shown in FIG. 8. Even so, the disk cartridge 200 would just be ejected a little less forward from the cartridge holder 60. But the operator would have no trouble removing the disk cartridge 200 from the cartridge holder 60 by sliding the disk cartridge 200 from the position shown in FIG. 7 to the one shown in FIG. 6 in the direction indicated by the arrow 60B.

As described above, by using the link mechanisms formed by the disk cartridge 200 and the first and second opening/closing levers 151 and 152, the disk drive of the present invention can open and close the first and second disk housing portions 221 and 222 while the disk cartridge 200 is being inserted or ejected. In addition, by taking advantage of the reversal of the biasing directions of the first and second lever biasing springs 153 and 154 (which is the function of the toggle springs), the operation of opening and closing the first and second opening/closing levers 151 and 152 and the operation of moving the clamper 50 up and down can be done synchronously with each other and at the best timing. As a result, the inserting and ejecting operations can get done with good stability without causing interference between the clamper 50 and the disk cartridge 200 while the disk cartridge 200 is being inserted or ejected.

In the preferred embodiment described above, the disk housing 220 is opened or closed by using the first and second opening/closing levers 151 and 152. However, the first and second disk housing portions 221 and 222 of the disk cartridge 200 can rotate in mutually opposite directions synchronously with each other at the interlocking portions 221b and 222b of the first and second disk housing portions 221 and 222. That is why the first and second disk housing portions 221 and 222 could be opened or closed with only one opening/closing lever in theory.

In the disk cartridge 200, however, to open the window 220w, the disk housing 220 functioning as a housing should be rotated and the projection area of the disk cartridge 200 in the opened state becomes greater than in the closed state. For that reason, the guide walls 61a and 61b that contact with the outer side surface of the disk cartridge 200 to define the inserting and ejecting directions and positions should be located nowhere but near the front end of the disk drive 500 (i.e., closer to the holder opening 60e). Therefore, to insert or eject the disk cartridge 200 with good stability, the disk housing 220, which is the front end of the disk cartridge 200, should be guided as will be described later.

Figure 12:
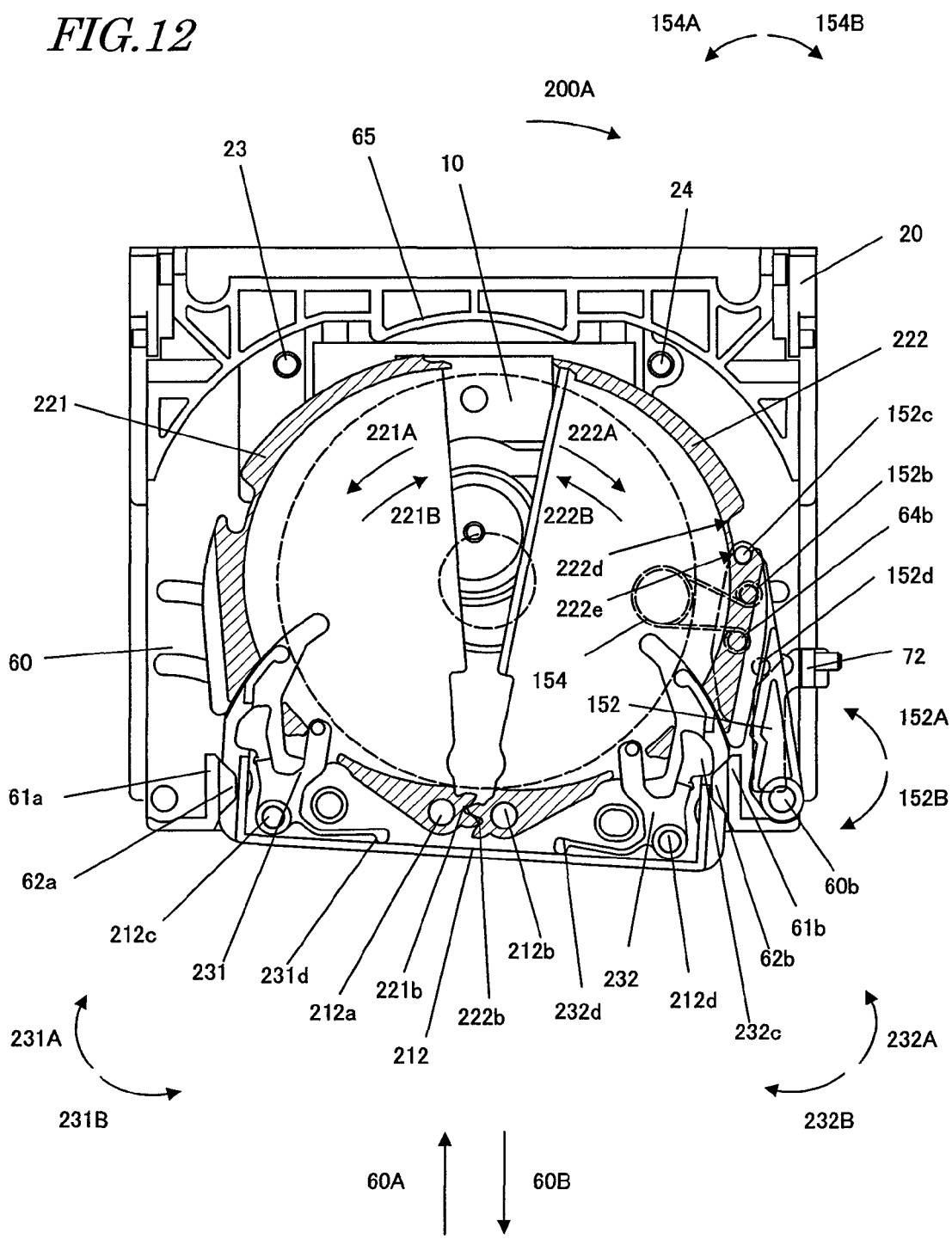
FIG. 12 is a plan view illustrating a status of the disk drive shown in FIG. 1 during the opening or closing operation thereof in a situation where the first opening/closing lever is removed from the disk drive.

FIG. 12 is a plan view illustrating how the disk drive 500 would operate if only the second opening/closing lever 152 and the second sliding member 72 were used with the first opening/closing lever 151 and the first sliding member 71 removed.

As shown in FIG. 12, if the operator inserts the disk cartridge 200 in the direction indicated by the arrow 60A, the engaging portion 152c of the second opening/closing lever 152 soon gets engaged with the catching portion 222e of the second disk housing portion 222. Then, the second opening/closing lever 152 rotates in the direction indicated by the arrow 152B, thus rotating the second disk housing portion 222 in the direction indicated by the arrow 222A. As a result, the first disk housing portion 221 also rotates in the direction indicated by the arrow 212A because the interlocking portions 221b and 222b engage with each other.

In this case, however, the disk cartridge 200 is guided in the direction indicated by the arrow 60A just by the guide walls 61a and 61b of the cartridge holder 60. As for the disk housing 220 located deep inside the disk drive 500, only the second disk housing portion 222 is supported by the second opening/closing lever 152.

Thus, as the operator inserts the disk cartridge 200 in the direction indicated by the arrow 60A, the second disk housing portion 222 and the second opening/closing lever 152 form a link mechanism, which supports the second disk housing portion 222 firmly and turns the second disk housing portion 222 in the direction indicated by the arrow 222A. Meanwhile, the first disk housing portion 221 also rotates in the direction indicated by the arrow 221A because the first disk housing portion 221 is interlocked with the second disk housing portion 222 at the interlocking portions 221b and 222b. However, since there is no first opening/closing lever 151, the first disk housing portion 221 cannot be guided sufficiently. As a result, imbalanced load is placed on the first and second disk housing portions 221 and 222.

Consequently, the deeper the operator inserts the disk cartridge 200 in the direction indicated by the arrow 60A, the lighter the load placed on the first disk housing portion 221 of the disk cartridge 200. That is to say, the disk cartridge 200 will be inserted while tilting in the direction indicated by the arrow 200A. As a result, the disk cartridge 200 cannot be inserted properly and it is difficult to open the disk housing 220 as intended.

Suppose the disk cartridge 200 has been inserted properly. In that case, the second disk housing portion 222, engaged with the second opening/closing lever 152, will be positioned properly with respect to the traverse base 20. On the other hand, the position of the first disk housing portion 221 in the opened state is determined only by the engaging state of the interlocking portions 221b and 222b. As a result, the opening area of the window 220w would vary significantly. This is because as the interlocking portion 221b is arranged near the pivot 212a, the error caused by slight misfit between the interlocking portions 221b and 222b will be magnified greatly at the end of the first disk housing portion 221. Furthermore, while the disk housing is opened, the first disk housing portion 221 is held only by being interlocked with the second disk housing portion 222 at the interlocking portions 221b and 222b, and therefore, will rotate easily in the direction indicated by the arrow 221A or 221B when subjected to some disturbance.

That is why if the disk housing 220 were opened and closed with only one opening/closing lever, then the operation of inserting or ejecting the disk cartridge 200 would lose stability and the opening area of the window 220w would vary significantly. For that reason, it is not preferable to provide only one opening/closing lever for the opening/closing mechanism of the disk cartridge 200 that should open and close the window 220w using the first and second disk housing portions 221 and 222 that function not only as shutters but also as a housing.

Also, when the disk housing 220 has been rotated to make the window 220w in the disk cartridge 200, the disk cartridge 200 will have a greater projection area than in the closed state as shown in FIG. 11. That is why the guide width between the guide walls 61a and 61b arranged at the front end of the disk drive 500 (near the holder opening 60e) becomes narrower than the width of the disk cartridge 200 including the first and second disk housing portions 221 and 222 in the opened state.

Therefore, even if the disk cartridge 200 could not be ejected to its predetermined position only by the biasing force applied by the first and second opening/closing levers 151 and 152 for some reason (e.g., some variation or failure of a member) and should be removed manually in the direction indicated by the arrow 60B by the operator, the first and second disk housing portions 221 and 222 that have been opened would contact with, and be closed by, the guide walls 61a and 61b while passing through the guide walls 61a and 61b at the holder opening. As a result, the disk cartridge 200 could also be removed with the first and second disk housing portions 221 and 222 closed.

Also, the first and second lever biasing springs 153 and 154 reverse their biasing directions. That is why even if the disk cartridge 200 were removed manually, the first and second opening/closing levers 151 and 152 could still go back to their rest positions safely without doing damage on any member.

In the preferred embodiment described above, the first and second engaging portions 151c and 152c of the first and second opening/closing levers 151 and 152 contact with the catching contact faces 221f and 222f of the first and second disk housing portions 221 and 222, respectively, thereby preventing the disk cartridge 200 from popping out of the disk drive 500. However, the same effect can also be achieved even if just one of the two engaging portions 151c and 152c contacts with its associated catching contact face 221f or 222f.

Also, in the preferred embodiment described above, the disk cartridge 200 is positioned with the cartridge positioning pins 21 and 22 arranged on the traverse base 20. However, the disk cartridge 200 may also be positioned with a different pair of pins.

Furthermore, in the preferred embodiment described above, the engaging portions 151c and 152c of the first and second opening/closing levers 151 and 152 engage with the catching contact faces 221f and 222f of the first and second disk housing portions 221 and 222, thereby preventing the disk cartridge 200 being ejected from popping out. However, it is also possible to prevent the disk cartridge 200 from popping out by using either another preventing mechanism or a frictional member such as a rubber sheet.

Furthermore, in the preferred embodiment described above, while the disk cartridge 200 is being ejected, the operator rotates the cartridge holder 60 manually in the direction indicated by the arrow 20A. However, the cartridge holder 60 can also be rotated by using the biasing force applied in the direction indicated by the arrow 20A. Also, in such a situation where the biasing springs are used, if the movement of the first and second sliding members 71 and 72 in the direction indicated by the arrow 60A is regulated by the cartridge holder 60 in the state in which the disk cartridge 200 is readily inserted and ejected as shown in FIG. 4(a), the biasing springs can also be used as stoppers that prevent the cartridge holder 60 from rotating in the direction indicated by the arrow 20A.

As described above, when a disk cartridge is inserted into the disk drive of the present invention, the gap between the engaging portions of the first and second opening/closing levers is narrower than the gap between the pair of guide walls. That is why the engaging portions of the first and second opening/closing levers can contact and engage firmly with the disk cartridge being inserted. In addition, the first and second opening/closing levers rotate such that the gap between their engaging portions will become broader than the gap between the pair of guide walls when the disk drive has been loaded with the disk cartridge. For that reason, when the disk housing portions are opened, a big window can be made with the shutter and housing portions sticking out of the projection area of the disk cartridge when the disk housing portions are closed. Consequently, this disk drive is compatible with a disk cartridge that has a big head access window for its small overall size. The disk drive of the present invention can be used particularly effectively for a disk cartridge with first and second disk housing portions that function not only as shutters but also as a housing.

A disk drive according to the preferred embodiment described above can be used effectively to operate a disk cartridge 200 that opens and closes a window 220w with the first and second disk housing portions 221 and 222 functioning not only as shutters but also as a housing. Specifically, first and second opening/closing levers 151 and 152 that engage with their associated notches 221d and 222d of the first and second disk housing portions 221 and 222 are arranged symmetrically to each other with respect to the direction in which the disk cartridge 200 is inserted or ejected (i.e., the direction indicated by the arrow 60A or 60B). And the opening/closing levers are respectively rotated synchronously with the insertion or ejection of the disk cartridge 200, thereby opening or closing the first and second disk housing portions. Consequently, it is possible to guarantee that the disk cartridge 200 can go straight all the way, thus getting the insertion and ejection operations done with very good stability.

In addition, while the disk cartridge 200 is being inserted or ejected, the first and second disk housing portions 221 and 222 can be firmly held by the first and second opening/closing levers 151 and 152. Therefore, the disk cartridge can still be inserted or ejected with good stability even when subjected to some disturbance such as vibrations or shocks.

On top of that, the first and second opening/closing levers are biased by the first and second lever biasing springs, of which the biasing directions reverse. Thus, when the operator is inserting the disk cartridge, the first and second disk housing portions can be opened while giving appropriate operation load to the operator by using the biasing force that is applied in such a direction as to close the first and second disk housing portions. When the first and second lever biasing springs reverse their biasing directions during the inserting operation, the reversed biasing force is applied to the first and second opening/closing levers so as to insert the disk cartridge into the disk just as intended.

On the other hand, during the ejection of the disk cartridge, as the damper is moved up, the first and second opening/closing levers rotate, thus reversing the biasing directions of the first and second lever biasing springs. And under that reversed biasing force, the first and second opening/closing levers rotate so as to eject the disk cartridge. In addition, the first and second disk housing portions can also be closed just as intended.

Consequently, the operability of the disk drive while the disk cartridge 200 is being inserted or ejected into/from the drive (i.e., the operability at the man-machine interface) can be controlled solely according to the biasing force applied by the biasing springs. In addition, there is no need to provide any drive source or drive mechanism to get the disk cartridge insertion/ejection operation done. As a result, the number of members required can be reduced significantly and the weight and the cost of the disk drive can also be cut down.

Furthermore, by taking advantage of the reversal of the biasing directions of the first and second lever biasing springs 153 and 154, the opening and closing operations using the first and second opening/closing levers 151 and 152 are not exactly in synchronization with the operation of moving the damper 50 up and down using the damper holder 51 but only the first and second opening/closing levers 151 and 152 will move for some time. Consequently, the timing to open or close the disk housing 220 of the disk cartridge 200 and the timing to move the damper 50 up or down can be controlled.

More specifically, while inserting the disk cartridge 200, until the damper 50 gets ready to enter the inside of the disk cartridge 200, only the first and second opening/closing levers 151 and 152 operate, thereby opening the disk housing 220. After that, the opening operation by the first and second opening/closing levers 151 and 152 and the operation of moving the damper 50 down are carried out in parallel with each other, thereby inserting the disk cartridge 200 deeper into the drive and moving the damper 50 down at the same time.

On the other hand, while ejecting the disk cartridge 200, it is not until the damper 50 is moved up and has retreated from the window 220w of the disk cartridge 200 that the first and second opening/closing levers 151 and 152 operate so as to close the disk housing 220 and eject the disk cartridge 200. In this manner, by using the toggle mechanism including the first and second lever biasing springs 153 and 154, the timings to operate the two mechanisms can be selectively synchronized with each other such that only the first and second opening/closing levers 151 and 152 operate for a while. As a result, it is possible to prevent the disk cartridge 200 being inserted from being pressed excessively by the damper 50 and also possible to prevent the disk housing 220 being closed from sandwiching the damper 50 between them, thus getting the inserting and ejecting operations done with good stability.

On top of that, by arranging the unlocking portions 62a and 62b on the guide walls 61a and 61b of the cartridge holder 60, the unlocking portions 62a and 62b can be positioned more accurately with the profile of the disk cartridge 200 taken into consideration. Therefore, the first and second locking members 231 and 232 of the disk cartridge 200 can be pressed just as intended and can be unlocked at the best timing while the disk cartridge 200 is being inserted or ejected by performing the series of processing steps.

Furthermore, by arranging the first and second opening/closing levers 151 and 152 closer to the front end of the disk drive 500, the space left for the optical head 40 and the area in which the first and second opening/closing levers 151 and 152 are supposed to rotate do not overlap with each other. As a result, the optical head 40 can be designed more flexibly. In addition, since the optical head 40 does not overlap with the first and second biasing levers 151 and 152, the thickness of the disk drive can be reduced.

INDUSTRIAL APPLICABILITY

The disk drive of the present invention can be used effectively to read and/or write information from/on a disk housed in a disk cartridge that is designed to perform the read/write operations by any of various methods including optical, magneto-optical and magnetic ones. Among other things, the present invention is particularly effectively applicable to a disk drive to be loaded with a disk cartridge that houses a disk of a small diameter.

The invention claimed is:

1. A disk drive to be loaded with a disk cartridge that houses a disk therein, the drive comprising:
   a cartridge holder for holding the disk cartridge, the holder having a holder opening, through which the disk cartridge is inserted from outside of the drive into the cartridge holder and ejected out of the cartridge holder;
   a pair of guide walls, which is arranged in the vicinity of the holder opening of the cartridge holder to define disk cartridge inserting and ejecting directions;
   a disk motor, which has a turntable to mount the disk thereon and which rotates the turntable;
   a head for reading and/or writing information from/on the disk;
   a clamper for clamping the disk with respect to the turntable;
   a clamper holder, which holds the clamper rotatably and which rotates with respect to the cartridge holder, thereby performing a clamper up/down operation such that the clamper is moved up and down between a rest position where the clamper is out of contact with the turntable and a clamp position where the disk gets clamped on the turntable;
   a traverse base for supporting the head and the disk motor thereon and also supporting the cartridge holder rotatably;
   a first opening/closing lever, which has a first engaging portion to engage with a portion of the disk cartridge and which turns while the disk cartridge is being inserted or ejected;
   a second opening/closing lever, which has a second engaging portion to engage with another portion of the disk cartridge and which also turns while the disk cartridge is being inserted or ejected;
   a first lever biasing spring for biasing the first opening/closing lever;
   a second lever biasing spring for biasing the second opening/closing lever; and
   an interlocking mechanism that makes the first and second opening/closing levers rotate in synchronization with the clamp holder,
   wherein the first and second opening/closing levers turn such that when the disk cartridge starts to be inserted or finishes being ejected, the first and second engaging portions get engaged with the disk cartridge with a narrower gap left between themselves than the gap between the pair of guide walls and that when the disk cartridge gets loaded, the gap between the first and second engaging portions becomes wider than the gap between the pair of guide walls, thereby opening a window in the disk cartridge such that the head can access the disk and the disk motor can mount the disk thereon when the disk cartridge gets loaded and making the clamper holder move the clamper down and clamp the disk with respect to the turntable.

2. The disk drive of claim 1, wherein the first and second lever biasing springs are toggle springs that reverse directions to bias the first and second opening/closing levers between a direction to decrease the gap between the first and second engaging portions and a direction to increase the gap between the first and second engaging portions as the levers rotate, and
   wherein the reversing operation done by the toggle springs makes the first and second opening/closing levers, biased by the first and second lever biasing springs, drive the interlocking mechanism, and/or the rotation of the first and second opening/closing levers by the interlocking mechanism makes the toggle springs perform the reversing operation.

3. The disk drive of claim 2, wherein the interlocking mechanism includes:
   first and second sliding members that perform a slide operation in the inserting and ejecting directions to contact with the first and second opening/closing levers, thereby making the toggle springs perform the reversing operation and rotating the first and second opening/closing levers; and
   first and second connecting arms to be supported rotatably by the clamper holder and the first and second sliding members, and
   wherein the clamper holder, the first and second sliding members and the first and second connecting arms form link mechanisms, and
   wherein as the cartridge holder rotates, the first and second sliding members perform the slide operation, thereby rotating the first and second opening/closing levers.

4. The disk drive of claim 3, wherein the clamper holder has an engaging portion to get engaged with the traverse base, and
   wherein with the engaging portion engaged with the traverse base, as the cartridge holder rotates with respect to the traverse base, the clamper holder rotates with respect to the cartridge holder, thereby performing the clamper up/down operation.

5. The disk drive of claim 4, wherein the disk cartridge includes: first and second disk housing portions, each of which has a space to house the disk partially and which house the disk entirely when joined together; and a supporting base member for supporting the first and second disk housing portions so as to allow the first and second disk housing portions to turn around their respective pivots, and
   wherein the first and second engaging portions get engaged with the first and second disk housing portions, respectively, thereby turning the first and the second disk housing portions so as to open a window in the disk cartridge being inserted.

6. The disk drive of claim 1, wherein each of the first and second disk housing portions of the disk cartridge includes:
   a notch, with which an associated one of the first and second engaging portions of the first and second opening/closing levers engages rotatably;
   a pivot; and
   an interlocking portion,
   wherein the interlocking portions of the first and second disk housing portions engage with each other such that the first and second disk housing portions turn around the pivots in mutually opposite directions synchronously with each other.

7. The disk drive of claim 6, wherein as the first engaging portion gets engaged rotatably with the notch of the first disk housing portion while the disk cartridge is being inserted or ejected, a first link mechanism is formed by respective nodes that are defined by the pivot of the first opening/closing lever, the engagement between the first engaging portion and the notch, and the pivot of the first disk housing portion, and
   wherein as the second engaging portion gets engaged rotatably with the notch of the second disk housing portion while the disk cartridge is being inserted or ejected, a second link mechanism is formed by respective nodes that are defined by the pivot of the second opening/closing lever, the engagement between the second engaging portion and the notch, and the pivot of the second disk housing portion, and
   wherein as the first and second disk housing portions turn around their pivots in mutually opposite directions synchronously with each other, the first and second link mechanisms get the disk cartridge inserted in a predetermined direction.

8. The disk drive of claim 6, further comprising a positioning portion to contact with the outer edge of the disk when the disk cartridge is loaded,
   wherein the positioning portion and the disk contact with each other, thereby positioning the center of the disk with respect to the disk motor.

9. The disk drive of claim 8, wherein the positioning portion forms part of the cartridge holder.

* * * * *